United States Patent
Yoshioka et al.

(10) Patent No.: US 8,656,173 B2
(45) Date of Patent: Feb. 18, 2014

(54) ELECTRONIC IMAGE DATA VERIFICATION PROGRAM, ELECTRONIC IMAGE DATA VERIFICATION SYSTEM, AND ELECTRONIC IMAGE DATA VERIFICATION METHOD

(75) Inventors: Takashi Yoshioka, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 726 days.

(21) Appl. No.: 11/335,632

(22) Filed: Jan. 20, 2006

(65) Prior Publication Data

US 2007/0192609 A1     Aug. 16, 2007

(30) Foreign Application Priority Data

Jul. 13, 2005     (JP) ................................ 2005-203869

(51) Int. Cl.
     *H04L 29/06*      (2006.01)

(52) U.S. Cl.
     USPC ........... 713/176; 726/26; 713/187; 375/240.2

(58) Field of Classification Search
     USPC .............. 713/176; 380/201; 283/113; 726/26
     See application file for complete search history.

(56) References Cited

U.S. PATENT DOCUMENTS

| | | | |
|---|---|---|---|
| 5,875,249 A * | 2/1999 | Mintzer et al. ................. | 380/54 |
| 5,907,619 A * | 5/1999 | Davis ............................ | 713/176 |
| 6,064,764 A * | 5/2000 | Bhaskaran et al. ........... | 382/183 |
| 6,601,172 B1 * | 7/2003 | Epstein ......................... | 713/178 |
| 6,697,997 B1 | 2/2004 | Fujimura | |
| 6,907,527 B1 * | 6/2005 | Wu ............................... | 713/176 |

(Continued)

FOREIGN PATENT DOCUMENTS

| | | |
|---|---|---|
| JP | 1-163871 | 6/1989 |
| JP | 09-069971 | 3/1997 |

(Continued)

OTHER PUBLICATIONS

Fridrich et al., "Invertible Authentication Watermark for JPEG Images", 2001, IEEE, pp. 223-227.*

(Continued)

*Primary Examiner* — Taghi Arani
*Assistant Examiner* — Thaddeus Plecha
(74) *Attorney, Agent, or Firm* — Staas & Halsey LLP

(57) ABSTRACT

An electronic image data verification program disclosed herein is capable of detecting presence or absence of a change, specifying a changed portion (the position of a change) if present, and making the presence or absence and the changed portion provable to third parties, by generating partial signature information separately from electronic image information to be registered, by dividing and maintaining the partial signature information, and by clearly separating functions/roles of the electronic image information (original information) and the partial signature information (verification information). The present invention comprises: a partial signature information generation section 40 that uses partial information of electronic image information, to generate partial signature information for specifying presence or absence of a change to the electronic image information and a changed portion if a change has been made; a registration section 70 that registers the electronic image information and the partial signature information generated from the electronic image information; a storage section 80; and a partial signature verification section 50 that uses the electronic image information and the partial signature information registered by the registration section, to verify presence or absence of the change to the electronic image information, or a changed portion if a change has been made to the electronic image information.

9 Claims, 20 Drawing Sheets

(56) References Cited

U.S. PATENT DOCUMENTS

| | | |
|---|---|---|
| 7,251,343 B2* | 7/2007 | Dorrell et al. ............. 382/100 |
| 7,315,866 B2* | 1/2008 | Wu et al. ................. 707/102 |
| 2004/0013268 A1* | 1/2004 | de Queiroz .............. 380/201 |
| 2004/0015697 A1* | 1/2004 | de Queiroz .............. 713/176 |
| 2004/0255116 A1 | 12/2004 | Hane et al. |
| 2005/0015600 A1* | 1/2005 | Miyazaki et al. ......... 713/176 |
| 2005/0169499 A1* | 8/2005 | Rodriguez et al. ....... 382/100 |
| 2006/0020830 A1* | 1/2006 | Roberts .................. 713/194 |

FOREIGN PATENT DOCUMENTS

| | | |
|---|---|---|
| JP | 10-056557 | 2/1998 |
| JP | 2000-163409 | 6/2000 |
| JP | 2000-258024 | 10/2000 |
| JP | 2001-117820 | 4/2001 |
| JP | 2002-124027 | 4/2002 |
| JP | 2002-215029 | 7/2002 |
| JP | 2003-30008 | 1/2003 |
| JP | 2004-356802 | 12/2004 |
| JP | 2004-364070 | 12/2004 |
| JP | 2005-209833 | 8/2005 |

OTHER PUBLICATIONS

Masahiko Takenaka et al., "An Implementation of Partial Integrity Assurance Method for Image Data", The Institute of Electronics, Information and Communication Engineers; (6 pgs).

First Notification of Office Action dated Sep. 28, 2007 in corresponding Chinese Application No. 200610101427.6 (11 pages including translation).

Yasuo Hatano et al., "An Application of Digitally Signed Documents Sanitizing Scheme to Image Data", ("A Consideration into Application of Electronic Document Black-Overpainting Technique to Image Files"), Symposium on Cryptography and Information Security, 2005, Japan, Jan. 2005, pp. 1 to 5.

Kunihiko Miyazaki et al., "Digital Document Sanitizing Problem", ("Electronic Document Black Overpainting Problem"), Information Processing Society of Japan/Computer Security Group (CSEC) (Jul. 17, 2003) (2003-CSEC-22-009).

Kunihiko Miyazaki et al., "A Digital Document Sanitizing Scheme with Disclosure Condition Control", ("Electronic Document Black-Overpainting Technique Capable of Controlling Disclosure Conditions"), Symposium on Cryptography and Information Security, 2004, Japan 2004.

Japanese Office Action issued Oct. 20, 2010 in corresponding Japanese Patent Application 2005-203896.

Miyazaki K et al: "Digitally Signed Documents Sanitizing Scheme With Disclosure Condition Control" IEICE Transactions on Fundamentals of Electronics, Communications and Computer Sciences, Engineering Sciences Society, Tokyo, JP LNKD-DOI:10.1093/IETFEC/E88-A.1.239, vol. E88-A, No. 1, Jan. 1, 2005, pp. 239-246 XP001221184 ISSN: 0916-8508.

Izu T et al: "PIATS: A Partially Sanitizable Signature Scheme" Information and Communications Security. 7$^{th}$ International Conference, ICICS 2005. Proceedings (Lecture Notes in Computer Science vol. 3783) Springer-Verlag Berlin, Germany, 2005, pp. 72-83, XP002583680 ISBN: 3-540-30934-9.

Barreto P S L M et al: "Toward A Secure Public-Key Blockwise Fragile Authentication Watermarking" PROC. 2001 INT. CONF. On Image Processing; [International Conference on Image Processing], Thessaloniki, Greece LNKD-DOI:10.1109/ICIP.2001.958536, vol. 2, Oct. 7, 2011, pp. 494-497, XP010563806 ISBN: 978-0-7803-6725-8.

Kundur D et al: "Digital Watermarking for Telltale Tamper Proofing and Authentication" Processing of the IEEE, IEEE. New York, US LNKD-DOI:10.1109/5.771070, vol. 87, No. 7, Jul. 1, 1999, pp. 1167-1180, XO000914459 ISSN: 0018-9219.

European Search Report in corresponding European Application No. 06253461.5 mail date of Jun. 10, 2010.

Final Office Action mailed Jun. 11, 2013 in corresponding Japanese Application No. 2010-261194.

Japanese Office Action for application No. 2010-261194 issued Nov. 27, 2012.

Takashi Yoshioka et al., "Proposal on Partial Integrity Assurance Technology that Considers Correction and Distribution for Electronic Documents" 2004, 2pages.

Yasuo Hatano et al., "An Application of Digitally Signed Document Sanitizing Scheme to Image Data", 2005, 4pages.

\* cited by examiner

FIG.4

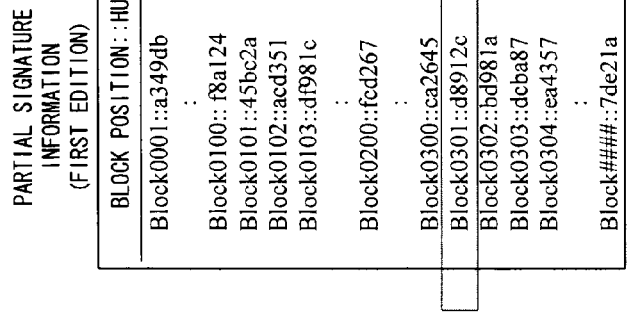

PARTIAL SIGNATURE INFORMATION (FIRST EDITION)

BLOCK POSITION::HUSH

Block0001::a349db
⋮
Block0100::f8a124
Block0101::45bc2a
Block0102::acd351
Block0103::df981c
⋮
Block0200::fcd267
⋮
Block0300::ca2645
Block0301::d8912c
Block0302::bd981a
Block0303::dcba87
Block0304::ea4357
⋮
Block####::7de21a

IMAGE INFORMATION (ORIGINAL)

RECEIPT

JUNE 1, 2005
RECEIPT NO. RS-001

FUJITSU LIMITED
MR. TAKASHI YOSHIOKA

WE'VE RECEIVED THE FOLLOWING AMOUNT:

YEN20,000.-

AS THE ENTRANCE FEE OF ○○ RESEARCH CLUB FOR
MR. TAKASHI YOSHIOKA

CHAIRMAN OF EXECUTIVE COMMITTEE
○○ RESEARCH CLUB

MASAHIKO TAKENAKA

〒123-4567 1-1 □□ CHO, ◇◇ CITY
○○ RESEARCH CLUB HEAD OFFICE

ADD A RANDOM NUMBER TO THE
301-TH BLOCK TO GENERATE
HUSH INFORMATION

GENERATION RESULT = d8912c

| STORAGE RECEIPT | |
|---|---|
| IMAGE ID | 22362067 |
| STORAGE TIME | 17:19 21" 2005/6/1 |
| EDITION NO. | 1.0 |
| CREATOR | STAFF IN CHARGE OF CREATION |
| TITLE | RECEIPT |
| SIGNER | STAFF IN CHARGE OF CREATION |

FIG.8

```
                                        JUNE 1, 2005
                    RECEIPT              RECEIPT NO. RS-001
FUJITSU LIMITED
MR. ▓▓▓▓▓▓▓▓

WE'VE RECEIVED THE FOLLOWING AMOUNT:
                         YEN20,000.-

AS THE ENTRANCE FEE OF ○○ RESEARCH CLUB FOR
 MR. ▓▓▓▓▓▓▓
                         CHAIRMAN OF EXECUTIVE COMMITTEE,
                         ○○ RESEARCH CLUB
                                    MASAHIKO TAKENAKA
                    〒123-4567 1-1 □□ CHO, ◇◇ CITY
                    ○○ RESEARCH CLUB HEAD OFFICE
```

FIG.10

| STORAGE RECEIPT | |
|---|---|
| IMAGE ID | 22362067 |
| STORAGE TIME | 10:54 09" 2005/6/1 |
| EDITION NO. | 2.0 |
| CREATOR | STAFF IN CHARGE OF BLACK-OVERPAINTING |
| TITLE | RECEIPT |
| SIGNER | STAFF IN CHARGE OF BLACK-OVERPAINTING |

FIG.11

```
IMAGE IDID: 22362067
┌─────────────────────────────────────────────────────────┐
│ EDITION NO.: 1.0                                        │
│ ┌──────────────────────┬──────────────────────────────┐ │
│ │      JPEG IMAGE      │  PARTIAL SIGNATURE INFORMATION│ │
│ │                      │   Bk1::a349db                │ │
│ │      [flower]        │   Bk2::29dbfa                │ │
│ │                      │   ...                        │ │
│ │                      │   Bk301::d8912c              │ │
│ └──────────────────────┴──────────────────────────────┘ │
│  PROOF INFORMATION                                      │
│      (STAFF IN CHARGE OF CREATION)   TIME STAMP         │
│      ELECTRONIC SIGNATURE            20050601171921     │
│                                                         │
│  PARTIAL SIGNATURE GENERATION INFORMATION               │
│      Bk1::94831                                         │
│      Bk2::37282                                         │
│      ...                                                │
│      Bk301::39012                                       │
│      RANDOM NUMBER INFORMATION                          │
├─────────────────────────────────────────────────────────┤
│ EDITION NO.: 2.0                                        │
│ ┌──────────────────────┬──────────────────────────────┐ │
│ │      JPEG IMAGE      │  PARTIAL SIGNATURE INFORMATION│ │
│ │                      │   Bk1::a349db                │ │
│ │   [flower with       │   Bk2::29dbfa                │ │
│ │    black overpaint]  │   ...                        │ │
│ │                      │   Bk301::df5422              │ │
│ └──────────────────────┴──────────────────────────────┘ │
│  PROOF INFORMATION                                      │
│      (STAFF IN CHARGE OF BLACK-OVERPAINTING)  TIME STAMP│
│      ELECTRONIC SIGNATURE            20050610105409     │
│                                                         │
│  PARTIAL SIGNATURE GENERATION INFORMATION               │
│      Bk1::94831                                         │
│      Bk2::37282                                         │
│      ...                                                │
│      Bk301::58297                                       │
│      RANDOM NUMBER INFORMATION                          │
└─────────────────────────────────────────────────────────┘
```

FIG.17

```
                                              JUNE 1, 2005
                          RECEIPT              RECEIPT NO. RS-001
FUJITSU LIMITED
MR. XXXXXXXX

WE'VE RECEIVED THE FOLLOWING AMOUNT:
                          YEN̶2̶0̶,̶000.-

AS THE ENTRANCE FEE OF OO RESEARCH CLUB FOR
MR. XXXXXXXX
                          CHAIRMAN OF EXECUTIVE COMMITTEE,
                          OO RESEARCH CLUB
                                    MASAHIKO TAKENAKA
                          〒123-4567 1-1 □□ CHO, ◇◇ CITY
                          OO RESEARCH CLUB HEAD OFFICE
```

ELECTRONIC IMAGE DATA VERIFICATION PROGRAM, ELECTRONIC IMAGE DATA VERIFICATION SYSTEM, AND ELECTRONIC IMAGE DATA VERIFICATION METHOD

BACKGROUND OF THE INVENTION

1. Field of the Invention

The present invention relates to an electronic image data verification program, an electronic image data verification system, and an electronic image data verification method by which presence or absence of a change made to image information such as a JPEG (Joint Photographic Experts Group), GIF (Graphics Interchange Format) or Bitmap (Microsoft Windows Bitmap) image is detected, a changed portion (the position of a change) if present is specified, and the presence or absence and the changed portion are made provable to a third party.

2. Description of the Related Art

As IT has been progressing in recent years, forms of administrative information, account ledgers in private companies, and contract documents have been being varied from conventional management and storage of paper documents to electronic (digital) documents. For example, as scanners have prevailed, documents conventionally stored as paper sheets can be converted into electronic data with ease. Further, as scanners having a high-resolution have been put into practice, electronic storage of paper documents which has not been accepted before is acceptable as far as particular security requirements are satisfied (e-Document Law: enforced in April 2005). Further, in place of the silver halide photography, image input apparatuses such as a digital camera for digitizing photograph information to record the digitized information as electronic data in a recording medium or the like have been put to practical use.

On the other side, needs for techniques of storing and managing electronic data safely have heightened as requests for this kind of electronic storage of documents and images have increased. In order that documents which are conventionally stored as paper sheets are stored electronically with evidence admissibility kept equivalent to paper sheets, technical requirements such as "detection/prevention of falsification", "identification of authors", "access management/control", "history management", and the like are said to be necessarily satisfied. To satisfy these requirements, conventional document management systems have too poor functions. Recently, rapid progress have been made in developments of an "originality guarantee system" which satisfies these requirements and introduction of the system into market.

In this "originality guarantee system", a security element technique which is used most generally is an electronic signature. The electronic signature is a technique capable of specifying or identifying the author of a document (originality) and simultaneously proving and convincing a third party that no changes have been made since the document was created (non-alteration). Three relevant conventional techniques will be cited below (e.g., Jpn. Pat. Appln. Laid-Open Publications No. 2000-285024 and No. 2001-117820, and non-patent report of Information Processing Society of Japan/Computer Security Group (CSEC) "Electronic Document Black-Overpainting Problem (Jul. 17, 2003) (2003-CSEC-22-009)".

The former two patent publications disclose techniques for maintaining originalities of electronic documents, as techniques for storing and managing original electronic documents.

The last non-patent report discloses a technique of solving a problem of black-overpainting on an electronic document as an electronic document paining technique.

In addition to the relevant techniques as described above, an SCIS 2004 report "Electronic Document Black-Overpainting Technique Capable of Controlling Disclosure Conditions" has proposed an electronic document black-overpainting technique by which whether additional black-overpainting on a disclosed part is possible or not is controllable. Further, as a consideration about application of this technique to an image file, an SCIS 2005 report "A Consideration into Application of Electronic Document Black-Overpainting Technique to Image Files" has been proposed.

Known as a digital watermarking technique is a technique capable of embedding an electronic watermark which satisfies particular regularity, in electronic data itself, and verifying whether the particular regularity is satisfied, thereby to detect whether the electronic data has been altered or not and the position of an alteration.

The conceptions of originality guarantee as disclosed in the former two patent publications target such a document that has a clear location of an original, like in the case that a document in a fixed final form is safely managed as an original, as it were, a paper document is stored in a locker with a lock. In a circumstance of this kind, an electronic signature is a very effective technique for guaranteeing identity or non-alteration. However, suppose guarantee of originality of a document, like an application form or an approval document, to which partial operations or modifications such as additions, corrections, concealments, and the like are directly made. In this case, a general electronic signature scheme does not permit any processing at all due to the nature thereof and therefore inversely becomes an obstacle. That is, conventional techniques and products do not take into consideration the points as described above but most of conventional techniques are techniques for storing electric data, kept in complete forms, with use of an electronic signature.

Problems in the techniques disclosed in the above two patent publications will be described below.

The original electronic document storage techniques disclosed in the above two patent publications provide a technique by which electronic information is given the nature inherent to a paper original when storing electronic data and also a technique of protecting electronic data from being altered. That is, the inventions of these patent publications pay attention to the mechanism of storing and managing electronic documents in fixed final forms, as originals, i.e., how to safely store originals whose locations are clear and which can be accumulated in one organization. In this kind of circumstance of storing originals, if a correction is made to an electronic document, the correction is recognized as an "alteration" when the electronic document is only partially corrected.

Suppose, for example, a "correction to paper contract document". At the time of correction, a processing is performed: "cancel letters with a double line in a portion to be corrected, write correct letters into a blank space just above the line, and press a stamp of the corrector". However, even after a correction is made, the document is nothing more than the original of the contract document. Behavior of this kind in paper culture is publicly determined as a correction which has been made through due process, and is hence provable to a third party. In contrast, in case of an electronic document, the following problem arises if a conventional original storage technique is applied from the view point of evidence admissibility. That is, whether a corrected portion is of an alteration or a valid correction through due process cannot be determined. This can be understood from the view point of features of electronic signatures at present which are designed such that any changes to electronic data can be detected.

The electronic document black-overpainting technique disclosed in the last non-patent report proposes a technique of black-making electronic documents which solves, by a signature put on a document, the problem that verification is disabled by hiding a part of a document. By applying the electronic document black-overpainting technique according to this report, verification of a signature is possible even in a state where black-overpainting is effected on a signed electronic document, and no alteration having been made except the portion marked black is provable to third parties. Accordingly, proof to third parties in a state where the contents are partially hidden (black-overpainted)" is possible. According to the electronic document black-overpainting technique of this report, the creator of an original document is certified although who has conducted black-overpainting cannot be clearly identified. Further, the problem of black-overpainting on electronic documents in an information disclosure system is dealt with as a scene of use. However, no consideration has been taken into an idea that a partially black-overpainted document is distributed among plural entities to make further use of the document.

Another technique, i.e., the electronic watermarking provides a technique of embedding an electronic watermark that satisfies particular regularities, in electronic data. By verifying whether the particular regularities are satisfied or not, presence or absence of an alteration to the electronic data or the position of an alteration can be detected. However, this technique merely detects presence or absence of an alteration or the position thereof but does not consider proof to third parties.

On the other side, the same can be said for image information subjected to a scanning processing by use of a scanner or image information generated by a digital camera, personal computer, or the like. Image information may also be partially processed and presented to a third parity, in some cases. For example, there is a case of presentation with personal information (name, residence address, and the like) hidden (protected) by black-overpainting or the like based on the information disclosure low. Another case is that an additional description is added to a medical chart digitized by a doctor or the like when electronic medical charts (image information) or the like are shared among plural hospitals or medical departments. In these cases, the range of responsibility to black-overpainting or an additional operation is requested to be clarified as to "who has written what comment at which portion". In addition, these additional operations is also requested to be proved to third parties.

As has been described previously, the e-document law enforced in April 2005 permits conventional paper ledger sheets to be stored as electronically signed electronic data by scanning processing as far as data satisfies particular security requirements. However, according to the conventional techniques as described above, all electronic data including image information cannot clear three requirements of "e-Document Law+Information Disclosure Law+Personal Information Protection Law". This means, for example, that originality and completeness cannot be secured except hidden portions if electronically signed electronic data created under the requirement of the e-document law is protected/presented with personal information (name, residential address, and the like) hidden (black-overpainted) on the basis of the information disclosure law.

More specifically, by detecting an act of alteration or specifying an alteration position with personal information (name, residential address, and the like) protected, it is not possible to prove that, at the same time when performing a black-overpainting processing, the person who conducted black-overpainting or a malevolent third party altered portions which were not allowed to be changed. Simultaneously, the fact of an operation having been effected on those portions cannot be proved to third parties.

That is, single one of conventional techniques or a combination thereof cannot satisfy the requirements (A) to (E) below.

(A) Ability to prove that changed portions and the other portions can be distinguished from each other and the other portions have not been altered.

(B) Ability to specify/prove the person who made a change (black-overpainting or a correction).

(C) Ability to prove that portions other than hidden portions have not been altered even if a partial alteration has been hidden.

(D) Ability to prove the creator of an unhidden part even if another part is hidden.

(E) Ability to prove a history process (e.g., when, who, which portions, and how) from an original (first edition).

Next, problems specific to compressed image information will be described, paying attention to JPEG as one of data compression schemes for electronic image information. JPEG image information is an irreversible compression image format and can cover 24-bit colors (16,700,000 colors). Therefore, JPEG image information is said to be suitable for expressions such as photographs and the like which require a lot of colors. In compression of JPEG image information, the information quantity is reduced by cutting off a part of data concerning changes in color tones, exploiting the characteristics of human eyes which are said to be not so sensitive to changes in color tones as compared to changes in brightness. JPEG image information is divided into pixel units having an equal size (8×8 pixels), and is constituted by a set of blocks gathering up the pixel units. From the nature of keeping block units, this can be easily estimated to be a format structure suitable for specifying partial corrections, changes, and the like.

However, in the process of encoding after blocking an image into blocks, blocks as targets to be subjected to compression transformation are influenced by the other targets. A change to a block influences other blocks and causes a situation that an intended result cannot be obtained. This problem is pointed out in the report "A Consideration into Application of Electronic Document Black-Overpainting Technique to Image Files" of the "Symposium on Cryptopraphy and Information Security 2005 (SCIS 2005)". This report particularly targets black-overpainting to the JPEG compression image format and enables application of the electronic document black-overpainting technique (SUMI-4) in units of blocks. However, SUMI-4 is realized by embedding hush information in a black-overpainted block. Hence, whether a corresponding portion is image information or hush information cannot be distinguished even if the contents of data are analyzed. There still remains a problem that SUMI-4 is not suitable for the image format. This problem occurs because both of image information and hush information are binary information. Consequently, application of SUMI-4 to JPEG image files can be presumed to be difficult.

The present invention has been made to solve the problems described above and has an object of detecting presence or absence of a change, specifying portions of changes, and making those changes provable to third parties, by generating partial signature information separately from electronic image information to be registered, by dividing and maintaining the partial signature information, and by clearly separating functions/roles of the electronic image information (original information) and the partial signature information (verification information).

SUMMARY OF THE INVENTION

To solve the above problems, an electronic image data verification program according to an aspect of the present invention makes a computer execute verification of electronic image information, and comprises: a partial signature information generation step that uses partial information of electronic image information, to generate partial signature information for specifying presence or absence of a change to the electronic image information and a changed portion if a change has been made; a registration step that registers the electronic image information and the partial signature information generated from the electronic image information; and a verification step that uses the electronic image information and the partial signature information registered by the registration step, to verify presence or absence of the change to the electronic image information, or a changed portion if a change has been made to the electronic image information.

The electronic image data verification program may further comprise an electronic image format transformation step that transforms an electronic image format into another electronic image format, with respect to the electronic image information, wherein the registration step registers the electronic image information in the transformed electronic image format.

In the electronic image data verification program, the partial signature information generation step uses, as partial information of the electronic image information, intermediate information in an intermediate process when the electronic image information is transformed into the another electronic image format by the electronic image format transformation step.

The intermediate information uses intermediate information by which partial information of the electronic image information is not influenced from other parts, in the electronic image format transformation process.

The partial signature information generation step divides the electronic image information into plural blocks each as the partial information of the electronic image information, and generates the partial signature information for every one of the blocks.

The partial signature information generation step adds arbitrary information to partial information of the electronic image information, and generates the partial signature information, based on the partial information and the arbitrary information.

The partial signature information generation step uses a hush function to generate the partial signature information with respect to the partial information of the electronic image information.

When generating first electronic image information as the electronic image information and the partial signature information with respect to the second electronic image information different from the first electronic image information, the partial signature information generation step generates the partial signature information by adding the same arbitrary information as added to the first electronic image information, to the same portions of the second electronic image information as the first electronic image information, while the partial signature information generation step generates the partial signature information by adding different arbitrary information to portions of the second electronic image information that have been changed from the first electronic image information. Electronic signatures of a creator and a person who has made a change may be given to the entire of each of the electronic image information and the partial signature information, and may be registered by the registration step.

In the present invention, electronic image information in an electronic image format according to any of an irreversible compression scheme, reversible compression scheme, and non-compression scheme is used as the electronic image information.

A random number is used as the arbitrary information.

An electronic image data verification system according to another aspect of the present invention comprises: a partial signature information generation section that uses partial information of electronic image information, to generate partial signature information for specifying presence or absence of a change to the electronic image information and a changed portion if a change has been made; a registration section that registers the electronic image information and the partial signature information generated from the electronic image information; and a verification section that uses the electronic image information and the partial signature information registered by the registration section, to verify presence or absence of the change to the electronic image information, or a changed portion if a change has been made to the electronic image information.

The electronic image data verification system further comprises an electronic image format transformation section that transforms an electronic image format into another electronic image format, with respect to the electronic image information, wherein the registration section registers the electronic image information in the transformed electronic image format.

An electronic image data verification method according to further another aspect of the present invention is carried out in an electronic image data verification system, and comprises: a partial signature information generation step that uses partial information of electronic image information, to generate partial signature information for specifying presence or absence of a change to the electronic image information and a changed portion if a change has been made; a registration step that registers the electronic image information and the partial signature information generated from the electronic image information; and a verification step that uses the electronic image information and the partial signature information registered by the registration step, to verify presence or absence of the change to the electronic image information, or a changed portion if a change has been made to the electronic image information.

According to the present invention, the following advantages can be achieved. Presence or absence of a change to electronic image information registered can be detected. A changed portion (position of a change) if present can be specified. The presence or absence of a change and the changed portion can be proved to third parties.

BRIEF DESCRIPTION OF THE DRAWINGS

FIG. 4 is a view showing an example of generation/contents of partial signature information at the time of registering an image;

FIG. 8 is a view showing an example of a black-overpainted receipt;

FIG. 10 is a table showing an example of contents of a storage receipt at the time of updating an image;

FIG. 11 is an image of a stored state at the time of update;

FIG. 17 shows an example of the verification result output screen in a black-overpainting processing and an unfair processing;

DETAILED DESCRIPTION OF THE PREFERRED EMBODIMENTS

Figure 1:
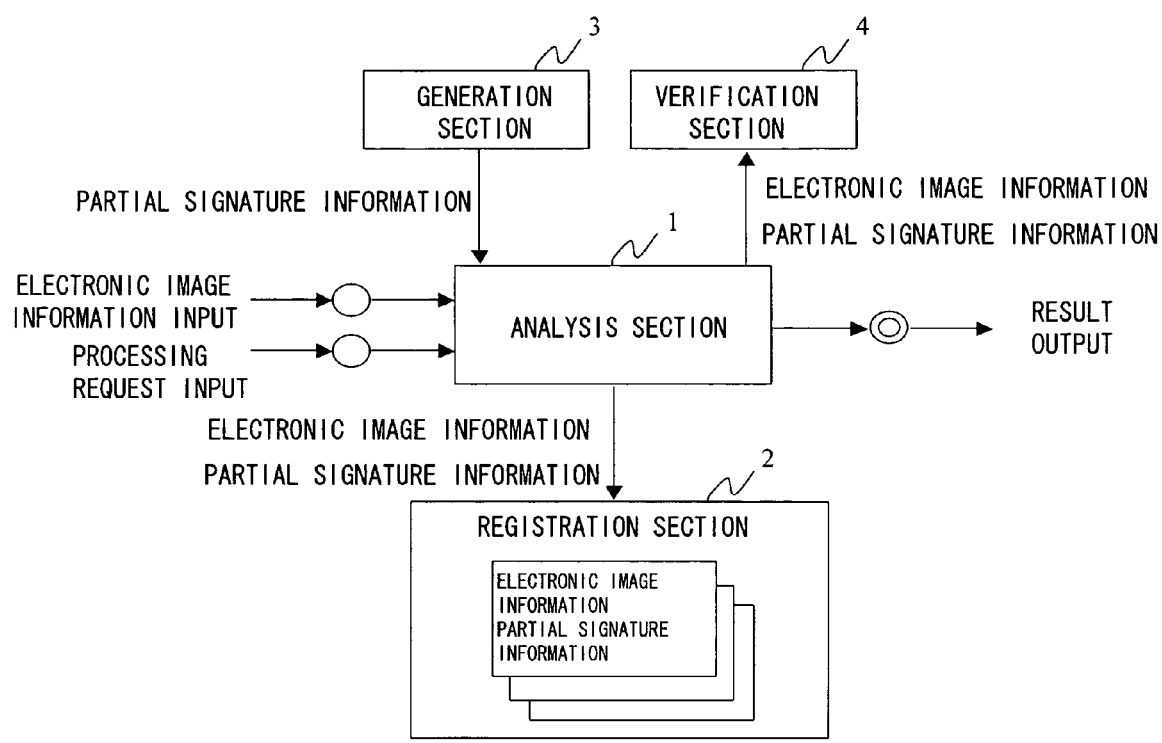
FIG. 1 is a block diagram showing the basic structure of the present invention.

FIG. 1 is a view showing principles of an electronic image data verification system according to the present invention. The electronic image data verification system in FIG. 1 has an analysis section 1, a registration section 2, a generation section 3, and a verification section 4.

The analysis section 1 provides functions to perform an analysis processing on input electronic image information, perform generation control and verification control of partial signature information, and output a processing result after registering the electronic image information as original information. The analysis section 1 is a central section that obtains input electronic image information and an input processing request, and provides functions as follows. That is, the analysis section 1 distinguishes the state of input electronic image information (original image information/compressed image information) and input processing requests (for coding processing/decoding processing/original image processing/verification processing). In response to the processing requests, respectively, the analysis section 1 performs a coding processing, a decoding processing, an original image processing, and a verification processing.

In the coding processing and decoding processing, intermediate information is used to generate and add partial signature information so that a block as a target might not be influenced from other blocks. A changed portion (the position of a change) can thus be clearly specified.

The registration section 2 provides a function to register image information and partial signature information supplied as input from the analysis section 1, in a form in which both the image information and partial signature information are related to each other. The image information and the partial signature information each are given an electronic signature of a creator and a time stamp, and are managed in a protected form so as not to allow intentional or accidental alterations after registration. By adding the electronic signature and time stamp, after-the-fact proof that the information created by the creator has not been altered from the time point when the information was created can be achieved.

If an after-the-fact court case or the like takes place, the image information and the partial signature information are submitted as evidence when a proof to third parties is needed. At this time, necessary information is extracted from the registration section 2. When updating image information registered in the registration section 2, the image information is created/registered as a new edition, keeping the image information (old edition) registered for the last time. Partial signature information is generated and related to the corresponding edition number of the new edition. Thus, a pair of image information and partial signature information are registered and managed for every edition number.

By using the registration section 2 having this kind of function, the state of an appropriate edition number can be proved to third parties upon necessities.

The generation section 3 provides a function to generate partial signature information for each block unit, taking as input information the block information in which image information is divided into arbitrary fixed pixel units. The partial signature information generated by the generation section 3 is information necessary to detect presence or absence of a change to image information, specify a changed portion (position of a change) if present, and make the presence or absence and the changed portion provable to third parties. Which block information partial signature information belongs to is clearly managed by the partial signature information. The partial signature information together with corresponding image information is registered later in the registration section 2, and is managed both information related to each other.

The verification section 4 provides a function to detect presence or absence of a change and specify/output a changed portion (the position of a change) if present, from partial signature information of each edition number.

According to this kind of electronic image data verification system, presence or absence of a change to image information can be detected more clearly and simply and a changed portion (the position of a change) if present can be also more clearly and simply specified and proved to third parties, compared with single one or a combination of conventional techniques.

Figure 2:
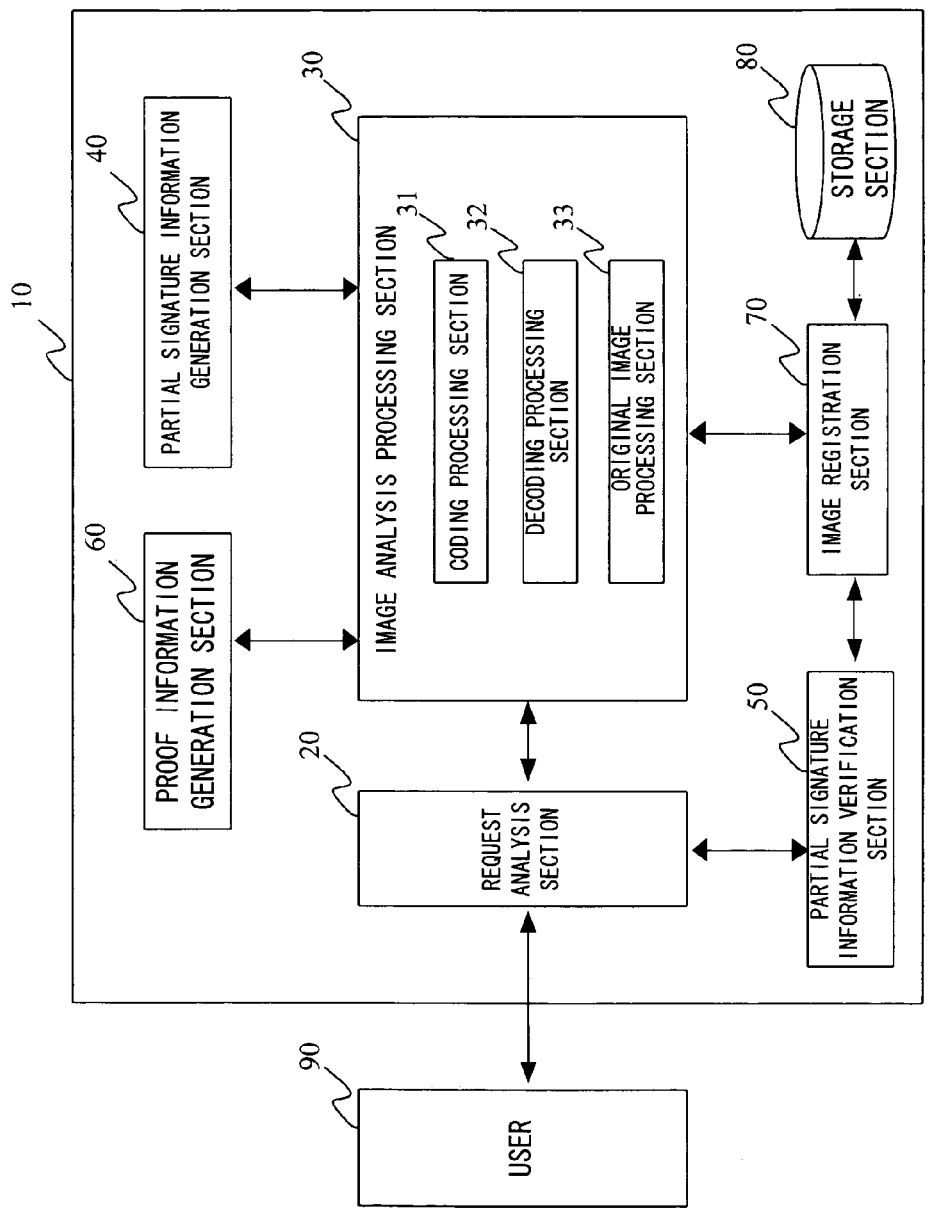
FIG. 2 is a block diagram showing the structure of an electronic image data verification system in the embodiment of the present invention.

FIG. 2 shows an example of the structure of the electronic image data verification system. The electronic image data verification system 10 shown in FIG. 2 has a request analysis section 20, an image analysis processing section 30, a partial signature information generation section 40, a partial signature information verification section 50, a proof information generation section 60, an image registration section 70, and a storage section 80.

The request analysis section 20 receives input information from a user 90 and transmits output information to the user 90, and has a central function to control various commands for processing data. The request analysis section 20 accepts processing requests from the user 90, and assigns processing to the image analysis processing section 30 and partial signature information verification section 50, in response to respective processing requests. The section 20 further returns results of the processing.

The image analysis processing section 30 accepts, from the request analysis section 20, input electronic image information (original image information/compressed image information) and input processing requests (for coding processing/ decoding processing/original image processing/verification processing). The section 30 then provides measure to execute processing corresponding to the respective requests. The image analysis processing section 30 is constituted by three sub-elements of a coding processing section 31, a decoding processing section 32, and an original image processing section 33.

The coding processing section 31 is a processing section which is called if input electronic image information is original image information and if a coding processing request is given. The section 31 calls the partial signature information generation section 40, taking as input the block information being halfway during compression transformation of the original image information, and obtains generated partial signature information.

The obtained partial signature information and the transformed compressed image information are given an electronic signature and a time stamp by the proof information generation section 60.

After completion of these processing, the partial signature information and the transformed compressed image information are managed in a form integrated with the storage section 80 through the image registration section 70. When storing both information, information indicating which process halfway during coding the partial signature information has been generated in is managed together. A storage receipt indicative of registration complete and a processing result will be returned later as output. This storage receipt will become information to be transferred together when the image information is updated (changed, black-overpainted, or the like) in the next and subsequent sessions, and will be used for searches for image information managed by the storage section 80.

The decoding processing section 32 is a processing section which is called if the input electronic image information is compressed image information and an input processing request is a decoding processing request. The section 32 calls the partial signature information generation section 40, taking block information as input halfway during reverse transformation of the compressed image information, and obtains partial signature information. An electronic signature and a time stamp are obtained and given to the obtained partial signature information and the inputted compressed image information by the proof information generation section 60.

After completion of these processing, the partial signature information and the compressed image information are managed in a form integrated with the storage section 80 through the image registration section 70. At the time of storing both information, information indicating which process halfway during coding the partial signature information has been generated in is managed together. A storage receipt indicative of registration complete and a processing result will be returned later as output. This storage receipt will become information to be transferred together when the image information is updated (changed, black-overpainted, or the like) in the next and subsequent sessions, and will be used for searches for image information managed by the storage section 80.

The original image processing section 33 is a processing section which is called if input electronic image information is original image information and if an input processing request is an original image processing request. The section 33 calls the partial signature information generation section 40, inputs the block information of the original image information to generate and obtain partial signature information. The obtained partial signature information and the input original image information are given an electronic signature and a time stamp by the proof information generation section 60.

After completion of these processing, the original image information and the partial signature information are managed in a form integrated with the storage section 80 through the image registration section 70. When storing both information, information indicating that the partial signature information is generated directly from the original image information (non-compression processing) is managed together. A storage receipt indicative of registration complete and a processing result will be returned as output. This storage receipt will become information to be transferred together when the image information is updated (changed, black-overpainted, or the like) in the next and subsequent sessions, and will be used for searches for image information managed by the storage section 80.

The partial signature information generation section 40 accepts partial signature information generation requests from respective processing sections of the image analysis processing section 30 and generates partial signature information with respect to image information. When generating partial signature information, the section 40 obtains block information given from the image analysis processing section 30 and records together position information indicating which block the partial signature information corresponds to. Simultaneously, partial signature information in a form including a random number is generated for each block. Why partial signature information including a random number is generated will now be described below.

The partial signature information verification section 50 accepts partial signature information verification requests from the request analysis section 20, and verifies partial signature information with respect to image information.

The proof information generation section 60 accepts proof information generation requests from the respective processing sections of the image analysis processing section 30, and generates information of an electronic signature and a time stamp which is necessary for a proof to third parties. Adopted as electronic signatures are those issued by public organizations through CA (a third-party issuance organization: Certificate Authority). Adopted as time stamps are those issued also by public organizations through TA (a time distribution station: Time Authority). In this way, reliability and truthfulness of the information are strengthened so that a strict proof to third parties can be achieved.

The image registration section 70 accepts registration requests from the respective processing sections of the image analysis processing section 30, relates image information to partial signature information, and performs a processing of registration in the storage section 80.

The storage section 80 accepts a storage request from the image registration section 70 and performs a storage processing in a form integrating image information and partial signature information.

In the structure as described above, the partial signature information generation section 40, the image registration section 70, and the partial signature information verification section 50 of the present embodiment respectively constitute, in corporation with the image analysis processing section 30, a partial signature information generation section, a partial signature information registration section, and a partial signature information verification section of the present invention. The image analysis processing section 30 constitutes an electronic image format transformation section according to the present invention.

The structure and roles of respective sections in the present system have been described above. A method of applying the present system supposing a scene of use will be described below. In this scene of use, the present system is supposed to deal with the JPEG format as a data compression scheme for electronic image information.

A scene where a user uses the present system can be a situation that an electronic image is recorded/stored as signed image information. There further can be a case that the signed electronic image information recorded/stored is presented later to a third party upon necessity on the basis of the information disclosure law. Simultaneously, from the viewpoint of application of the personal information protection law, the image information has to be presented to the third party with personal information (name, residential address, phone number and the like) hidden (black-overpainted), depending on the contents.

At this time, evidentness and provability as follows are requested to be ensured. For example, black-overpainted portions and the other portions have to be distinguishable from each other. The fact that the other portions have not been altered has to be proved. The creator of the original image and the person who is an arranger of the black-overpainted image have to be specified. Therefore, the user uses the present system as measures for remaining records so that image information can be submitted as evidence when an after-the-fact case occurs. Alternatively, the user uses the present system when proving image information to a third party.

As characters who show up in this scene of use, three persons appear. One is a "staff in charge of creation" who registers electronic image information in the present system. Another is a "staff in charge of black-overpainting" who extracts electronic image information registered/stored by the staff in charge of creation, and performs a black-overpainting processing on a portion to be hidden, and reregisters the image information in the present system. Further another one is a "staff in charge of verification" for carrying out a proof to third parties with respect to the electronic image information registered/stored in the present system. These three carry out the process as follows.

(Creation)

The staff in charge of creation conducts registration in the present system, using image information as input. Suppose, at this time, that original image information in a BMP format is given as input image information and accordingly processing into the JPEG format is performed. In addition, there are measures which give image information in the JPEG format and performs a coding processing, and measures which give image information in the BMP format and analyzes directly the image information in the BMP format, in the creation processing. However, these two measures will be described separately.

(Black-Overpainting)

When a due cause for hiding personal information takes place based on the information disclosure law, the staff in charge of black-overpainting executes a black-overpainting processing on the portion of personal information in image information which the staff in charge of creation has registered. The staff in charge of black-overpainting then reregisters the image information in the present system.

(Confirmation)

Each of the staff in charge of creation and the staff in charge of black-overpainting carries out validity confirmation of the contents of the electronic image information which the staff has registered/stored. This example will be described supposing that the staff in charge of black-overpainting carries out the validity confirmation.

(Verification)

Shortly after completion of the black-overpainting processing/registration, the staff in charge of verification specifies a black-overpainted portion, and confirms and verifies that no other change has been made than the black-overpainted portion.

In the above scene of use, the present system provides the following four functions for the staff in charge of creation, black-overpainting, and verification.

(A) Registration function (used by the staff in charge of creation when registering image information)

(B) Update function (used by the staff in charge of black-overpainting when black-overpainting image information)

(C) Confirmation function (used by the staff in charge of black-overpainting when confirming the contents of image information)

(D) Verification function (used by the staff in charge of verification when verifying image information)

Operations in the respective events (A) to (D) will now be described below.

Prerequisites for this scene of use are that user identification information of the users 90 (the staff in charge of creation, black-overpainting, and verification) has been registered in advance so that the users 90 can use the present electronic image data verification system 10 and that strict access control is effected. This scene of use, each of the staff in charge of creation, black-overpainting, and verification starts with accessing to/logging in this present system.

(A) Registration of Image Information

Figure 3:
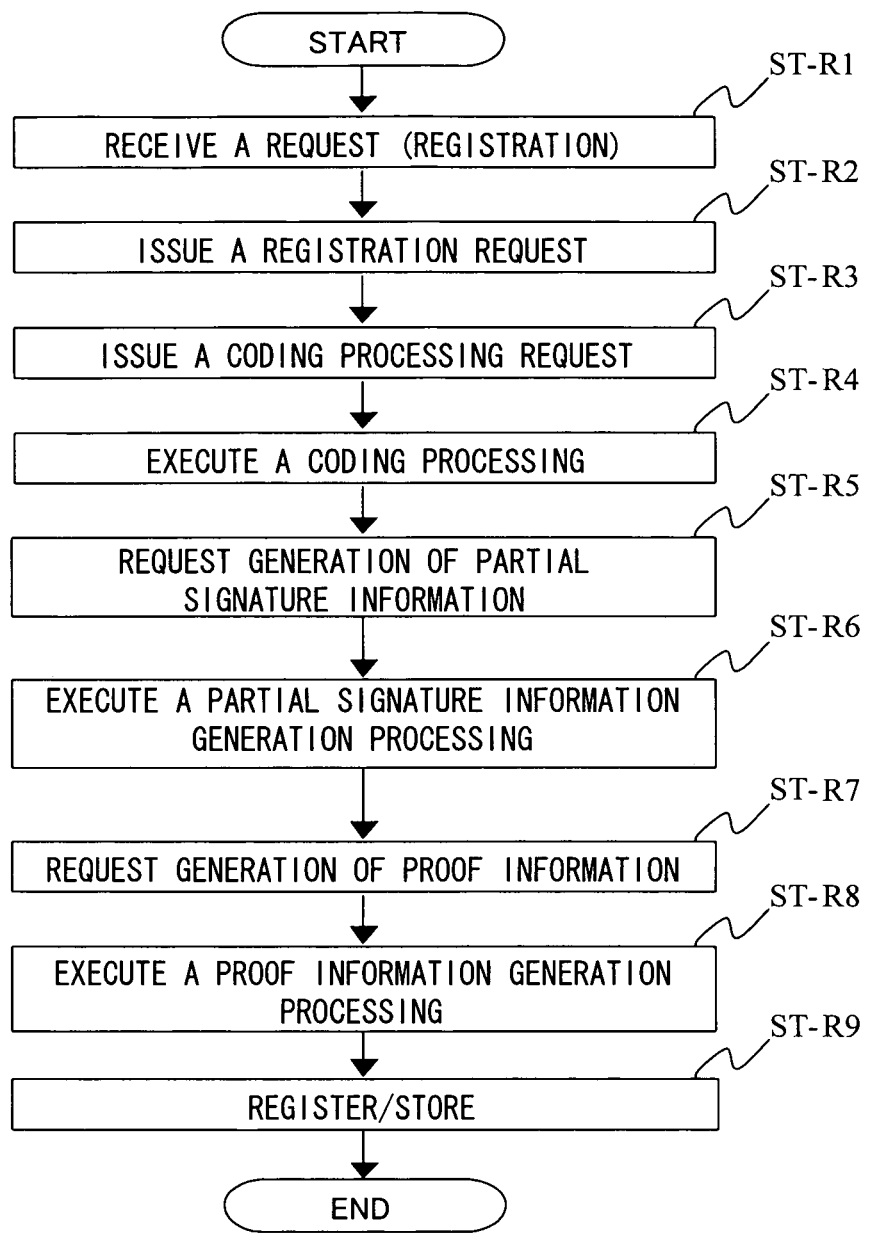
FIG. 3 is flowchart of a registration processing.

FIG. 3 is a flowchart of a registration processing.

(1) The user 90 (the staff in charge of creation) selects a menu item "Image registration (JPEG transformation)" in the operation screen. Original image information in the BMP format to be registered is instructed as input and fixed. Then, an image registration request is issued to the request analysis section 20 in the electronic image data verification system 10.

(2) The request analysis section 20 in the electronic image data verification system 10 receives the image registration request (Step ST-R1), and issues a registration request to the image analysis processing section 30 (Step ST-R2).

(3) The image analysis processing section 30 issues a coding processing request to the coding processing section 31 (Step ST-R3).

(4) The coding processing section 31 executes (starts) a coding processing (Step ST-R4). A later description will be separately made of a specific coding processing scheme when registering image information, considering generation of partial signature information.

(5) The coding processing section 31 issues a partial signature information generation request using block information as input to the partial signature information generation section 40 during coding processing (Step ST-R5).

(6) The partial signature information generation section 40 generates hush information corresponding to block information given as input and executes a partial signature information generation processing (Step ST-R6). FIG. 4 shows an example of contents of partial signature information. For example, image information is divided into arbitrary fixed pixel units (e.g., 8×8 pixels), and a random number to be arbitrary information is connected to each block information item, to generate hush information for "block information+a random number". For example, FIG. 4 shows a state in which hush information "d8912c" is output as a result of generating the 301-th block. At this time, the state of storage can be understood so that whether the hush information is for information of the 301-th block or not can be confirmed.

Subsequently, a similar generation processing is performed on other blocks. In this example, hush information is generated/recorded in units of blocks. However, hush information may be generated/recorded by specifying a range, like Block 0300 to Block 0304. If hush information is thus recorded by specifying a range, positions of changes can be specified in the blocks within the range.

Also, in this example, partial signature information is generated with arbitrary information (a random number) added. However, random numbers need not always be added. Random numbers are added on the following grounds. That is, if attention is paid to two blocks in image information and if block information items of the two blocks are equal to each other, partial signature information items of the two blocks become equal to each other as a result. Hence, even with black-overpainting, original information can easily be presumed and may leak.

However, since data per block is sufficiently large in case of image information, original information cannot be presumed easily unlike XML documents. Safety much more improves if partial signature information is generated with random numbers added. Whether partial signature information should be generated with random numbers added or not can be selected depending on operations. After completion of generation of the partial signature information, a generation result is returned to the coding processing section 31 (Step ST-R6). After completion of execution of this processing, the coding processing in the step ST-R6 is terminated.

(7) The coding processing section 31 obtains partial signature information from the partial signature information generation section 40, and issues a proof information generation request to the proof information generation section 60 (Step ST-R7).

(8) The proof information generation section 60 generates information of an electronic signature and a time stamp which are necessary for a proof to third parties. The electronic signature is issued from CA (a third-party issuance organization: Certificate Authority), and the time stamp is issued from TA (a time distribution station: Time Authority). The obtained electronic signature and time stamp are returned as a generation result to the coding processing section 31 (Step ST-R8).

(9) The coding processing section 31 obtains proof information (an electronic signature and a time stamp) from the proof information generation section 60, and adds the proof information to coded JPEG image information and partial signature information, as well as to random number information. At this time, the signature of the staff in charge of creation is added to the electronic signature. After completion of adding the proof information, the section 31 issues a registration/storage request to the image registration section 70. These information items are stored in the storage section 80, integrated with each other (Step ST-R9).

(10) After completion of the processing described above, a storage receipt indicative of registration completion of an image and notification of successful completion are output to the user 90 (staff in charge of creation). Thereafter, the user 90 (staff in charge of creation) logs out, and normally terminates the registration processing. If an abnormality occurs, the user 90 (staff in charge of creation) is notified of the occurrence of the abnormality, and abnormally terminates the registration processing.

Figures 5, 6:
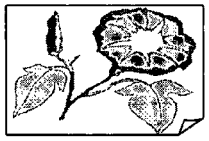
FIG. 5 is a table showing an example of contents of a storage receipt at the time of registering an image.
FIG. 6 shows an image of an example of contents of a stored state at the time of registration.

FIG. 5 shows an example of the contents of the storage receipt at the time of registering an image. This storage receipt is managed by the user 90 as a receipt slip, and will be used to update the image information (changes, black-overpainting, or the like), in the next and subsequent sessions.

FIG. 6 shows an image of storage at the time of registration and a state in which information items are related to each other with image ID used as search tag. Random numbers used as arbitrary information when generating partial signature information are seen to be managed as partial signature generation information.

(B) Update of Image Information

Figure 7:
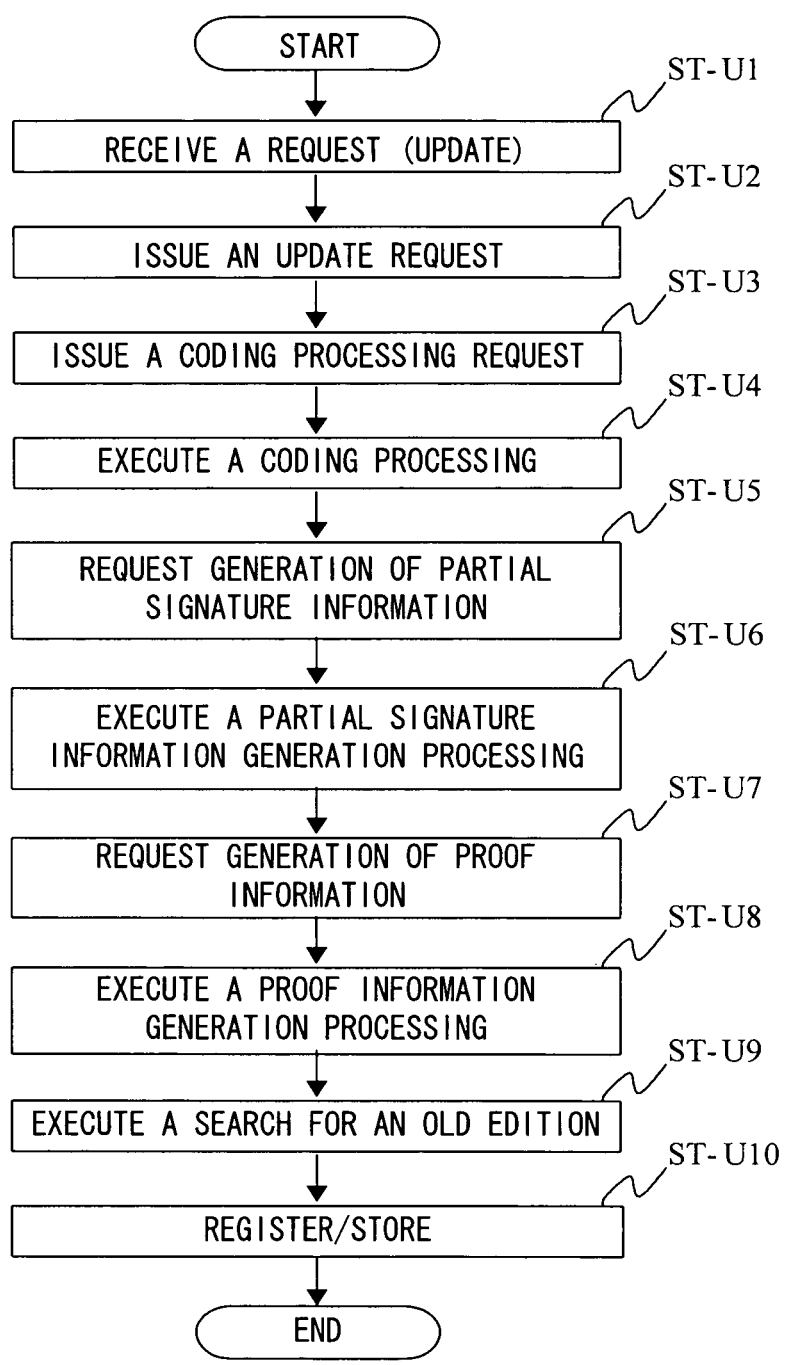
FIG. 7 is a flowchart showing operation of an update processing.

FIG. 7 is a flowchart of an update processing.

(1) The user 90 (staff in charge of black-overpainting) obtains image information in a BMP format used at the time of registration before the update processing from the staff in charge of creation. The user 90 performs a hiding (black-overpainting) processing on the portion of personal information, with use of an image edit tool prepared separately from the present system. The user 90 then stores again the image information as original image information in the BMP format. In this example, an image edit tool is used separately from the present system, to perform the black-overpainting processing. However, a mechanism like the tool may be built in the present system.

FIG. 8 shows a black-overpainted receipt, and this original image information is reregistered (updated) in the present system.

(2) The user 90 (staff in charge of black-overpainting) receives, from the staff in charge of creation, a storage receipt which has been obtained at the time of registration completion in the present system. This original image information in the BMP format and the storage receipt should preferably be stored and shared in a database which can be accessed only by authorized persons.

(3) The user 90 (staff in charge of black-overpainting) selects a menu item "Image update (JPEG transformation)" on the screen. By instructing and fixing the updated original image information in the BMP format and the storage receipt as input, an image registration request is issued to the request analysis section 20 in the electronic image data verification system 10.

(4) The request analysis section 20 in the electronic image data verification system 10 receives the image update request (Step ST-U1), and issues an update request to the image analysis processing section 30 (Step ST-U2).

(5) The image analysis processing section 30 issues a coding processing request to the coding processing section 31 (Step ST-U3).

(6) The coding processing section 31 starts execution of a coding processing (Step ST-U4). A description will be separately made later with respect to a specific coding processing at the time of updating an image in consideration of generation of partial signature information.

(7) The coding processing section 31 issues a partial signature information generation request to the partial signature information generation section 40 during execution of the coding processing, using block information as input (Step ST-U5).

Figure 9:
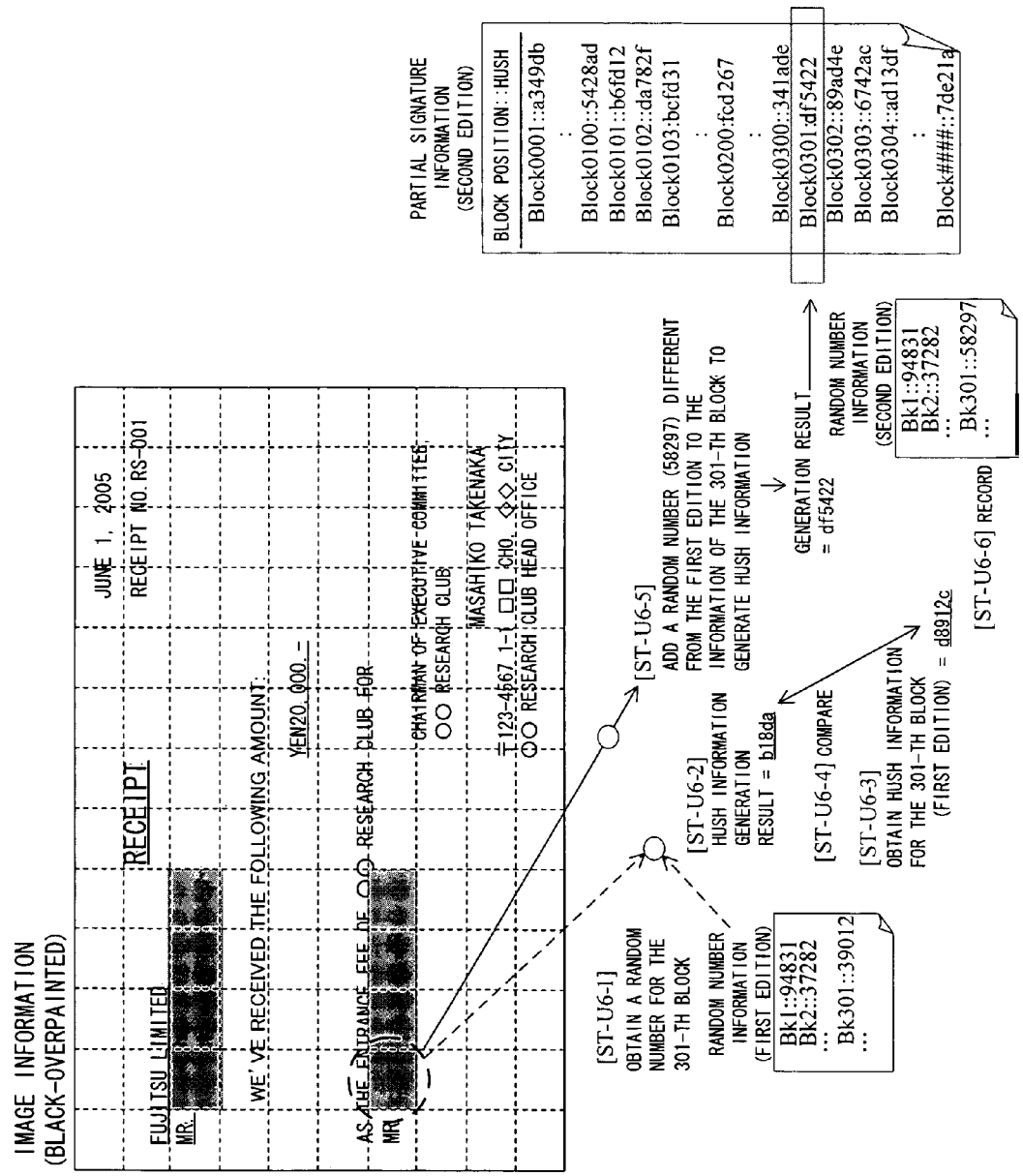
FIG. 9 is a view showing an example of generation and an example of contents of partial signature information at the time of updating an image.

(8) The partial signature information generation section 40 generates hush information corresponding to block information given as input (Step ST-U6). FIG. 9 shows examples of generation and contents of partial signature information at the time of updating an image. Partial signature information is generated in the order as described below. The generation of the partial signature information is performed from the first block. This example shows an example of generation of the 301-th block.

At first, partial signature information (first edition) and random number information (first edition) are obtained from the storage section 80 through the image registration section 70. The random number (=39012) of the 301-th block is obtained from the random number information (first edition) (Step ST-U6-1). Next, the information and the random number (=39012) of the 301-th block are connected to each other, to generate hush information (=b18da) (Step ST-U6-2).

Next, hush information (=d8912c) of the 301-th block is obtained from the partial signature information (first edition) (Step ST-U6-3) and compared with the hush information (=b18da) obtained in the step ST-U6-2 (Step ST-U6-4). At this time, both of the hush information items can be confirmed to be different from each other, showing that a change has been made from the state of the first edition. Therefore, new random number information of the 301-th block (=58297) is generated, and the information of the 301-th block and the random number (=58297) are connected to each other, thereby to generate new hush information (=df5422) (Step ST-U6-5).

Finally, as a generation result, "df5422" is recorded as hush information of the 301-th block of the partial signature information (second edition). Simultaneously, "58297" is recorded as the random number information of the 301-th block Of the random number information (second edition). That is, with respect to unchanged blocks, the same random numbers as those in the preceding edition are used. With respect to a block which has been changed, like the 301-th block in this example, partial signature information is generated by generating and adding a random number different from those in the preceding edition. In this manner, hush information for unchanged blocks stays the same as that of the preceding edition. No alteration having been made from the preceding edition can be proved to third parties.

In each changed block, hush information corresponding to the block has varied, and therefore, a change having been made can be confirmed. In addition, the block having been changed by the staff in charge of black-overpainting can be proved to third parties, from the electronic signature on the entire partial signature information. A similar generation processing is performed on each of other blocks. After completion of generation, a generation result is returned to the coding processing section 31. After completion of the processing in the step ST-U6, the coding processing started in the step ST-U4 is terminated.

(9) The coding processing section 31 obtains partial signature information from the partial signature information generation section 40, and issues a proof information generation request to the proof information generation section 60 (Step ST-U7).

(10) The proof information generation section 60 generates information of an electronic signature necessary for a proof to third parties and a time stamp. Like in the registration processing, the electronic signature is issued from the CA (a third-party issuance organization: Certificate Authority), and the time stamp is issued from the TA (a time distribution station: Time Authority). After obtaining the information, a generation result is returned to the coding processing section 31 (Step ST-U8).

(11) The coding processing section 31 obtains proof information (an electronic signature and time stamp) from the proof information generation section 60. The coding processing section 31 attaches the information to coded JPEG image information, partial signature information, and random number information. At this time, a signature of the staff in charge of black-overpainting is given as the electronic signature. After completion of attaching the information, the coding processing section 31 issues a registration/storage request to the image registration section 70.

(12) The image registration section 70 executes a search for image information of a corresponding old edition from the storage section 80, based on the storage receipt given as input (Step ST-U9). At this time, the search is executed, using an image ID stored in the storage receipt, as a search key. If corresponding image information is found, respective information items are stored in the storage section 80, in a form integrated with each other (Step ST-U10). At this time, the image information of the old edition is not overwritten but storage is executed such that image information of every edition number can be proved to third parties.

(13) If the processing is successfully completed, a storage receipt indicative of update completion of an image and a notification of the successful completion are output to the user 90 (staff in charge of black-overpainting). Thereafter, the user 90 (staff in charge of black-overpainting) logs out, and normally terminates the update processing. If an abnormality occurs, the user 90 (staff in charge of black-overpainting) is notified of the abnormality as an error, and abnormally terminates the processing.

FIG. 10 shows an example of contents of a storage receipt at the time of updating an image. This storage receipt is managed as a receipt slip by the user 90, and will be used when the image information will be updated (changed, black-overpainted, or the like) again.

FIG. 11 shows an image of the storage state at the time of update, wherein respective information items are managed, related to each other and using an image ID and an edition number used as search tags. A random number used as arbitrary information at the time of generation of partial signature information found to be managed as partial signature information, like in the edition number 1.0.

(C) Confirmation of Image Information

Figure 12:
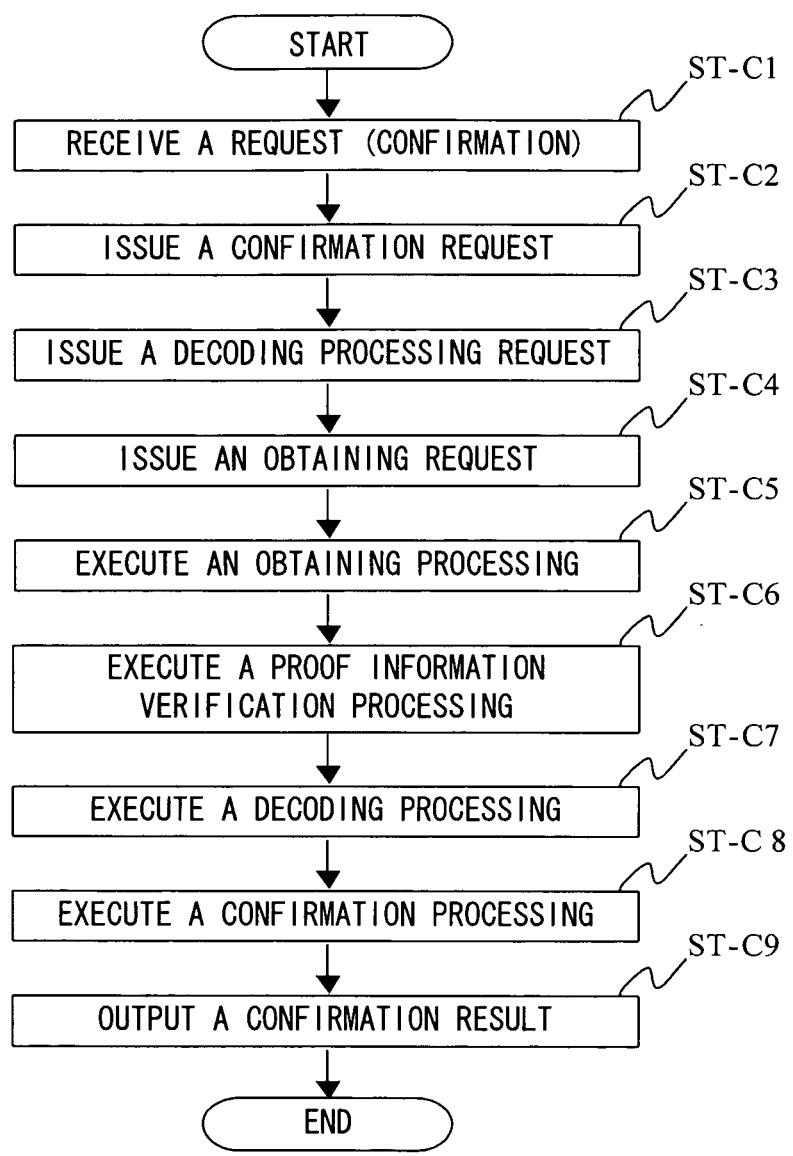
FIG. 12 is a flowchart of a confirmation processing.

FIG. 12 is a flowchart of a confirmation processing.

(1) The user 90 (staff in charge of black-overpainting) obtains a storage receipt which has been obtained at the time of completion of updating in the present system. This storage receipt should preferably be stored and shared in a database which can be accessed only by authorized persons.

(2) Upon selection of a menu item "Image confirmation" on the screen by the user 90 (staff in charge of black-overpainting), a "Target image list" of images which can be handled (confirmed) by the staff in charge of black-overpainting is displayed.

(3) The user 90 (staff in charge of black-overpainting) selects and fix an image to verify from the "Target image list" on the screen. Then, an image confirmation request is issued to the request analysis section 20 in the electronic image data verification system 10. At this time, a corresponding storage receipt is transferred also as input information.

(4) The request analysis section 20 in the electronic image data verification system 10 receives the image confirmation request (Step ST-C1), and issues an image confirmation request to the image analysis processing section 30 (Step ST-C2).

(5) The image analysis processing section 30 issues a decoding processing request to the decoding processing section 32 (Step ST-C3).

(6) The decoding processing section 32 issues an image obtaining request to the image registration section 70 (Step ST-C4).

(7) The image registration section 70 searches for and extracts corresponding image information and partial signature information (random number information and generation time information) from the storage section 80, based on information described on a storage receipt given as input. The section 70 then returns both information items to the image analysis processing section 30 (Step ST-C5). At this time, obtained information items are (A) black-overpainted image [second edition] and (B) partial signature information [second edition] (random number information [second edition] and generation time information). The obtained information items described above are called a confirmation information group. The generation time information is information indicating which process during a coding processing or decoding processing partial signature information has been generated in. Details thereof will be described later.

(8) The decoding processing section 32 executes a verification processing of proof information (an electronic signature and time stamp) attached to the confirmation information group obtained from the image registration section 70, to confirm that the confirmation information group has not been altered after registration (Step ST-C6).

(9) After validity is found by the proof information verification, the decoding processing section 32 executes next the decoding processing of the image information (Step ST-C7). Through the following procedure, a confirmation processing is carried out (Step ST-C8). At first, a JPEG decoding processing is carried out, using as input the black-overpainted image (A) (second edition) obtained in the step ST-C5. During execution of this decoding processing, the partial signature information generation section 40 is called, and partial signature information is generated/obtained.

At this time, a random number attached when generating the partial signature information is generated with use of the random number information [second edition] obtained from the image registration section 70. Also, the generation time information indicating which process during a decoding processing described later the partial signature information has been generated in has been obtained from the image registration section 70. Therefore, the generation time information is used and processed such that the generation method maintains consistency. A specific decoding processing scheme at the time of confirming an image considering generation of partial signature information of this kind will be described later.

Next, partial signature information generated/obtained on real time and the partial signature information [second edition] (B) obtained from the image registration section 70 are used to compare all blocks, thereby to confirm that the partial signature information is identical throughout the entire image. That is, this processing is performed to confirm that individual block information items have not been replaced intentionally or accidentally throughout the entire image.

Figure 13:
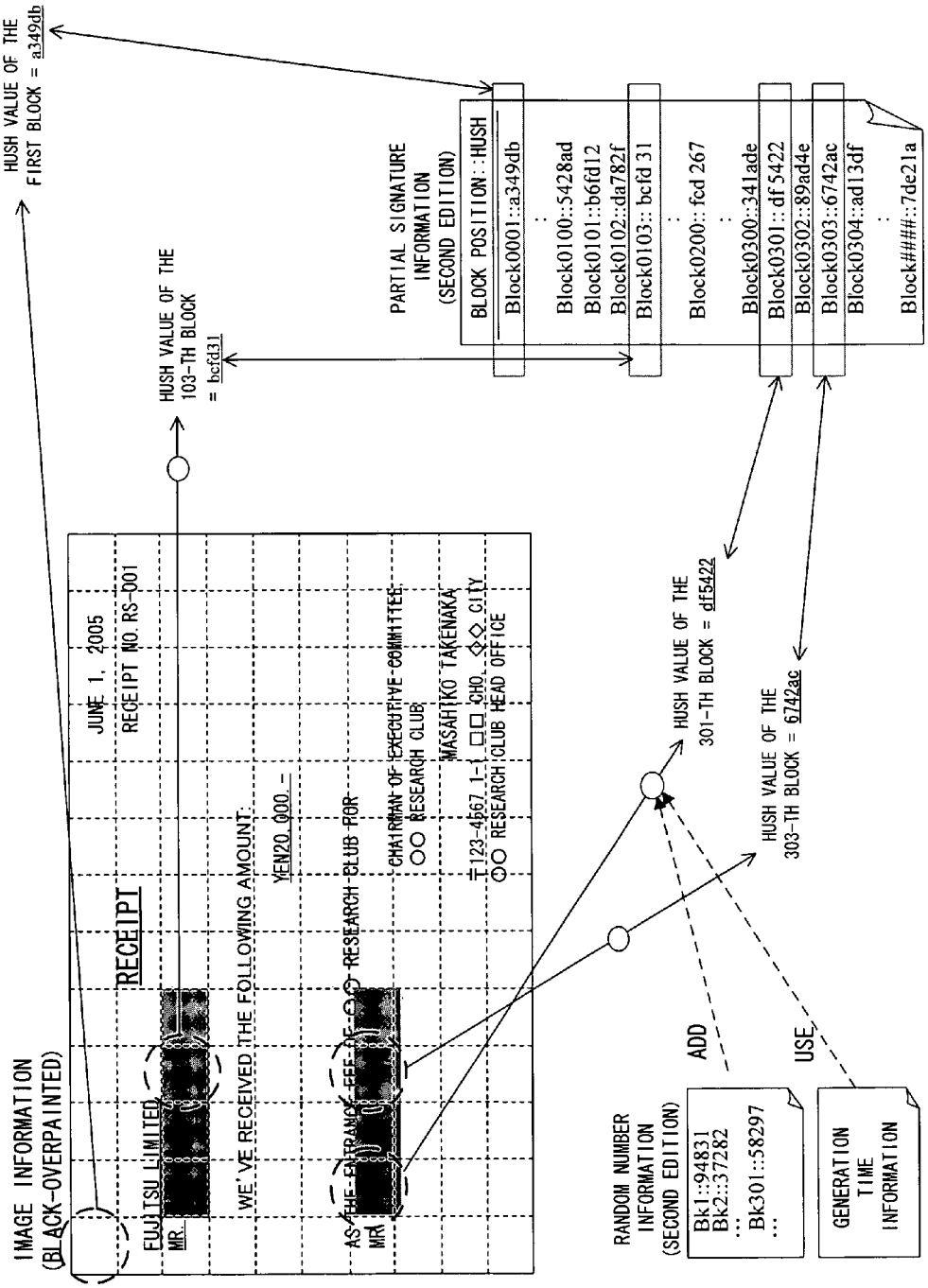
FIG. 13 shows an example of confirmation, using a black-overpainted image and partial signature information.

FIG. 13 shows a state of the confirmation. The decoding processing section 32 returns a confirmation result to the request analysis section 20. The request analysis section 20 outputs the confirmation result to the user 90 (staff in charge of black-overpainting) (Step ST-C9).

If the above processing is successfully completed, the user 90 logs out and normally terminates the confirmation processing. Otherwise, if an abnormality occurs, the user 90 (staff in charge of black-overpainting) is notified of the abnormality as an error, and the processing terminates abnormally.

(D) Verification of Image Information

Figure 14:
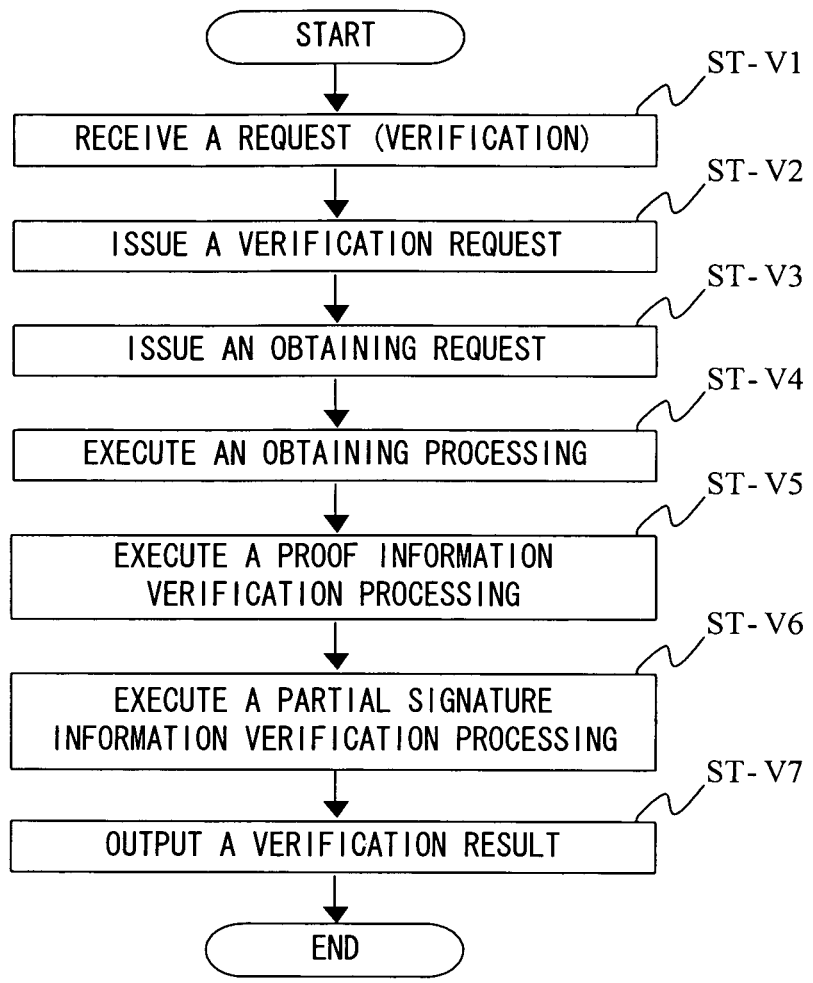
FIG. 14 is a flowchart of a confirmation processing.

FIG. 14 is a flowchart of the verification processing.

(1) The user 90 (staff in charge of verification) receives a storage receipt obtained at the time of completion of updating in the present system, from the staff in charge of black-overpainting. This storage receipt should preferably be stored and shared in a database which can be accessed only by authorized persons. Alternatively, the storage receipt may be received from the staff in charge of creation. A selection may be made depending on which edition the staff in charge of verification is going to verify.

(2) The user 90 (staff in charge of verification) selects a menu item "Image verification" on the screen. Then, a "Target image list" of image which the staff in charge of verification can handle (verify) is displayed.

(3) The user 90 (staff in charge of verification) selects and fixes an image to verify from the "Target image list" on the screen. Then, an image verification request is issued to the request analysis section 20 in the electronic image data verification system 10. At this time, a corresponding storage receipt is also transferred as input information.

(4) The request analysis section 20 in the electronic image data verification system 10 receives an image verification request (Step ST-V1), and issues an image verification request to the partial signature information verification section 50 (Step ST-V2).

(5) The partial signature information verification section 50 issues an image obtaining request to the image registration section 70 (Step ST-V3).

(6) Based on information described on a storage receipt given as input, the image registration section 70 searches for and extracts corresponding image information and partial signature information (random number information and generation time information) from the storage section 80, and returns both information items to the partial signature information verification section 50 (Step ST-V4). At this time, obtained information items are (A) an black-overpainted image [second edition], (B) partial signature information [second edition] (random number information [second edition] and generation time information), and (C) partial signature information [first edition]. These obtained information items are called a verification information group. Likewise, the generation time information is information indicating which process during a coding processing or decoding processing partial signature information has been generated in. Details of the generation time information will be described later.

(7) The partial signature information verification section 50 executes a verification processing on proof information (an electronic signature and a time stamp) attached to the verification information group obtained from the image registration section 70, to confirm that no alteration has been made after registration (Step ST-V5).

(8) After validity is confirmed through the proof information verification, the partial signature information verification section 50 executes next a verification processing on the verification information group (Step ST-V6). At this time, the verification processing is executed through the following procedure.

At first, the black-overpainted image [second edition] (A) and random number information [second edition] and generation time information obtained in the Step ST-V4 are used to confirm that partial signature information is identical throughout the entire image. This verification processing follows the logics of the decoding processing during the confirmation processing described previously. Descriptions thereof will be omitted herefrom.

Next, the partial signature information [second edition] (B) obtained in the step ST-V4 and the partial signature information [first edition] (C) are used to compare respective information items. Which portions have been subjected to black-overpainting processing, and that the other portions than the black-overpainted portions have not been altered are confirmed.

Figure 15:
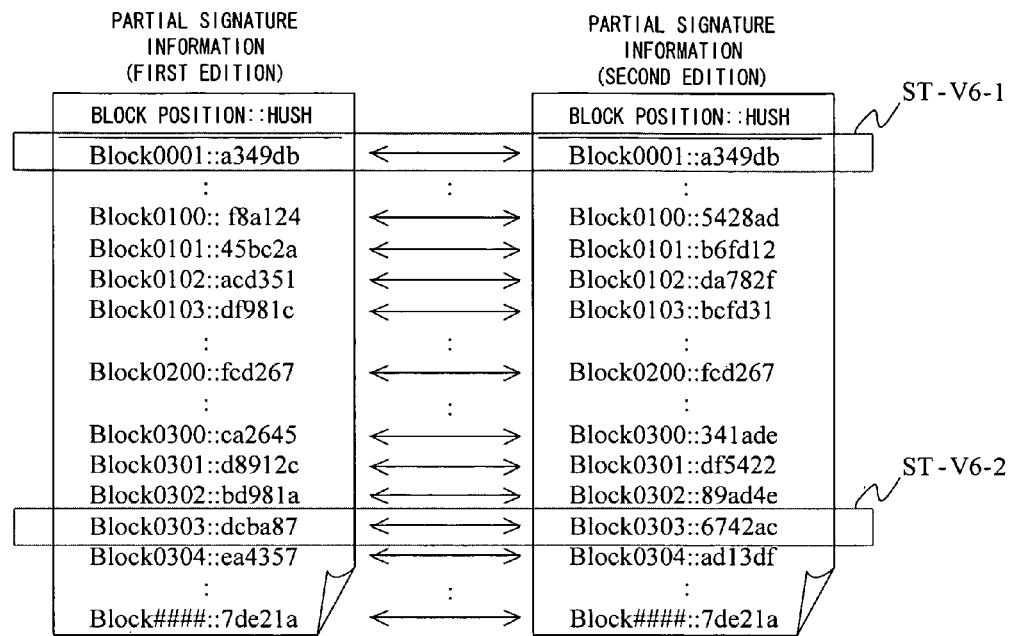
FIG. 15 is a view showing an example of comparison and verification, using new and old partial signature information.

FIG. 15 shows a state of the verification. For example, with respect to the first block, the hush information is "a349db" identical to both the first and second editions. Therefore, confirmation can be made that no alteration has been made (Step ST-V6-1). With respect to the 303-th block, the hush information of the first edition is "dcba87" and differs from "6742ac" of the second edition. Thus, verification can be made that alteration has been made at the time of updating from the first to the second edition (Step ST-V6-2). Verification can be made in a similar manner with respect to the other blocks.

(9) The partial signature information verification section 50 returns a verification result to the request analysis section 20. The request analysis section 20 outputs the verification result to the user 90 (staff in charge of verification) (Step ST-V7).

Figure 16:
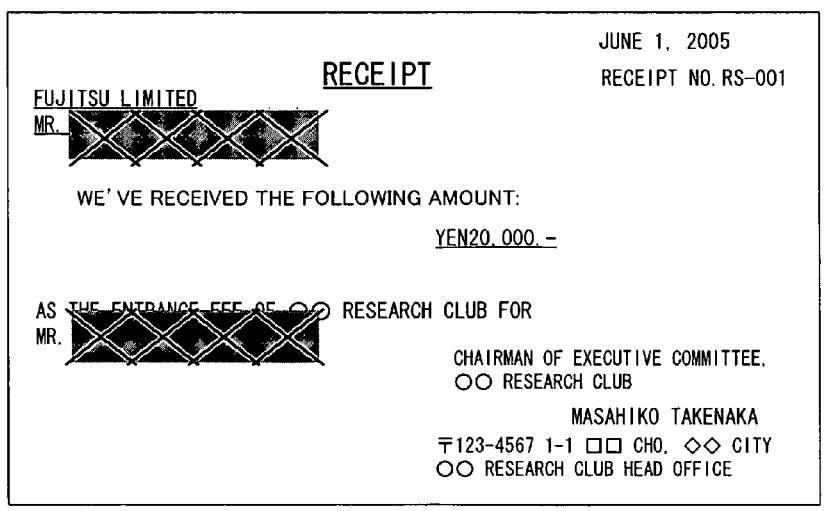
FIG. 16 shows an example of a verification result output screen.

FIG. 16 shows an example of a verification result output screen obtained from the verification result. For example, changes from an original image have been made to black-overpainted portions. These changes are therefore given cross marks. Blocks corresponding to the other portions than the black-overpainted portions have identical hush information. Hence, confirmation is made that no alteration has been made to those other portions and no cross marks are given.

There may be another method of outputting a notification telling "what number block has been changed and the other blocks have not been changed". However, a more easily understandable and practical method is to specify changed portions on a viewer by use of an image display application program or the like as shown in FIG. 16. If an unfair processing of changing the amount has been performed in addition to the black-overpainting processing, a verification result shown in FIG. 17 is obtained. In this case, obvious occurrence of an unfair action can be confirmed/proved to third parties with ease.

(10) If the above processing is successfully completed, the user 90 logs out and normally terminates the verification processing. If an abnormality occurs, the user 90 (staff in charge of verification) is notified of the abnormality as an error, and abnormally terminates the processing.

The above has described the registration function conducted by the staff in charge of creation in the JPEG coding processing, the update function and confirmation function conducted by the staff in charge of black-overpainting, and the verification function conducted by the staff in charge of verification, in the JPEG coding processing.

Figure 18:
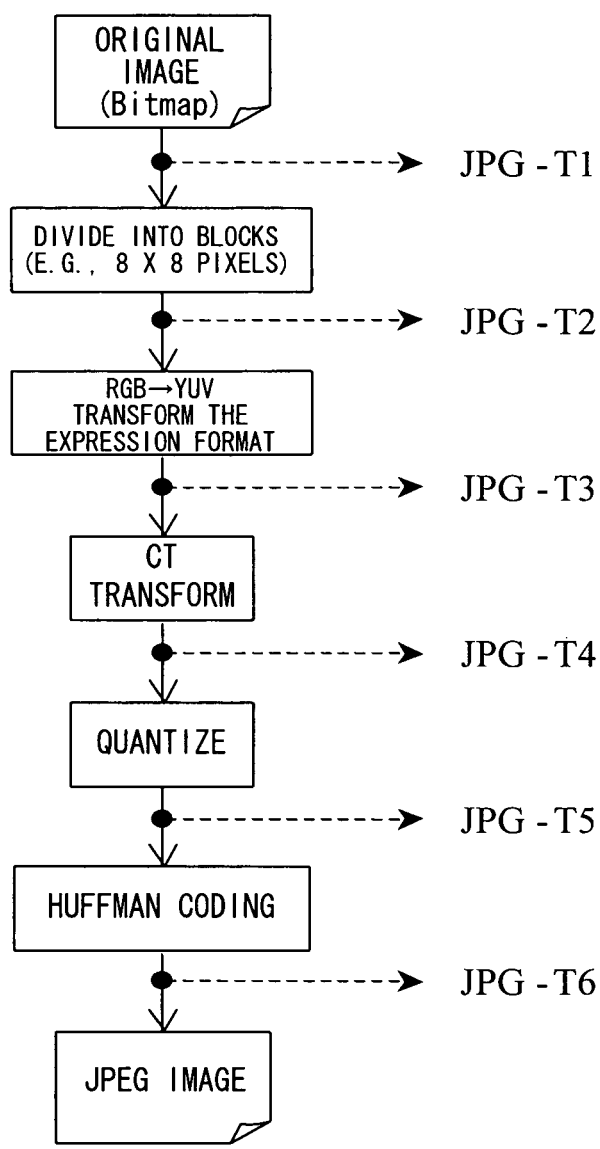
FIG. 18 shows a flow of a JPEG coding program.

Next, a description will be made of a specific coding processing performed at the time of image registration/update in consideration of generation of partial signature information. FIG. 18 shows the flow of the JPEG coding processing. In case of JPEG, an attempt to reduce the information quantity has been made mainly through the following procedure.

(1) Divide an original image (Bitmap) into blocks each consisting of arbitrary fixed pixels (for example, 8×8 pixels)

(2) Transform the RGB format into YUV (YCrCb) scheme (3) Transform a space area into a frequency area, using CT (cosine transform) in units of blocks described above (4) Quantize data transformed as described above (5) Perform entropy compression based on Huffman coding Which stage partial signature information is generated in will now be described in the process of the JPEG coding processing as described above. At first, a JPEG image is subjected to irreversible compression in the process of transformation from an original image (Bitmap) (in other words, the information quantity is reduced). The JPEG image thus has a characteristic that an original image (Bitmap) cannot be recovered perfectly from a compressed JPEG image. Due to this characteristic, the process from JPG-T1 to JPG-T4 as shown in FIG. 18 is influenced by the irreversible compression. Any part of this process cannot be said to be suitable for generation of partial signature information.

That is, if a decoding processing from a coded JPEG image is performed and if partial signature information is generated at a time point during JPG-T1 to JPG-T4, the partial signature information differs from that at a time point during JPG-T1 to JPG-T4. Therefore, verification cannot be performed normally.

A final object of the embodiment of the present invention is to verify specification of black-overpainted portions and/or non-alteration of the other portions than the black-overpainted portions even when personal information and the like are subjected to a black-overpainting processing. Therefore, even if regeneration is carried out as partial signature information, partial signature information of the other portions than the back-marked portions has to be obtained to be identical to partial signature information of an original image. If identical results are not obtained, neither fair verification nor specification of changed portions can be realized.

Therefore, the partial signature information should desirably be generated each time in a process capable of obtaining identical results, maintaining consistency. For example, even if partial signature information is generated in a stage from JPG-T1 to JPG-T2, the minimum unit influences 8×8 pixels. In other words, if only one bit is changed, the entire of the corresponding block is regarded as having been changed. This is not suitable or practicable. As has been described previously, the process of JPG-T1 to JPG-T4 results in irreversible transformation, and therefore, the same result cannot be obtained at the time of decoding.

In the process of JPG-T6, Huffman coding influences information of other blocks, and therefore, the same result cannot be expected in 8×8 pixel units. Further, in the stage of JPG-T6, verifiable parts become large in the process of JPG-T6 (for example, equivalent to one column of image information or the like), and therefore, practicable verification cannot be performed in 8×8 pixel units.

Therefore, with respect to the coding processing, the most efficient method in 8×8 pixel units can be said to be a method of generating partial signature information in the process of JPG-T5 which is not subjected to influences as described above. When generating partial signature information with respect to a black-overpainted image, a consistency needs to be maintained so as to generate partial signature information in the process of JPG-T5, like in the case of generating partial signature information of an original image.

Figure 19:
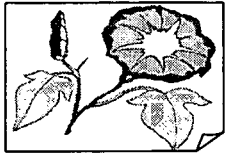
FIG. 19 shows an image of another example of contents of a stored state at the time of registration.

Thus, information (generation time information) concerning which process partial signature information has been generated in is managed together. In the next and subsequent sessions, partial signature information should preferably be generated with use of this generation time information. FIG. 19 shows an image of a storage state at the time of registering an image. Partial signature generation information is found to have been added with generation time information (notifying that the partial signature information has been generated at the time of JPG-T5 during JPEG coding).

Figure 20:
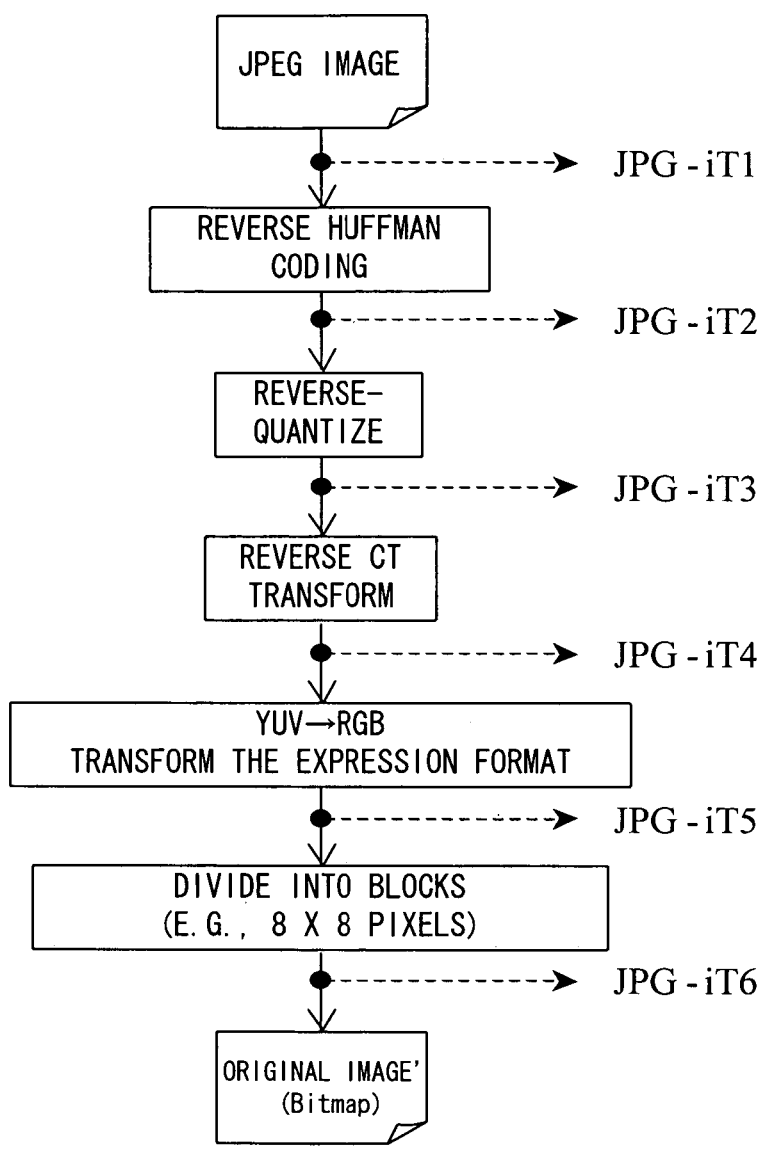
FIG. 20 shows a flow of a JPEG decoding program.

Next, a specific decoding processing scheme at the time of registering/updating an image will be described in consideration of generation of partial signature information. FIG. 20 shows a flow of a JPEG decoding program.

A description will now be made of which stage in the process of the JPEG decoding processing as described above partial signature information is generated in. At first, the decoding processing of a JPEG image may be basically considered as being carried out in the reverse procedure of the coding processing. In case of the JPEG decoding processing, the information quantity does not decrease, in contrast to the coding processing. Therefore, if partial signature information is generated at a time point from JPG-iT1 to JPG-iT6, the same result can be obtained each time. Therefore, partial signature information can be generated at any time point during the entire process from JPG-iT1 to JPG-iT6.

Figure 21:
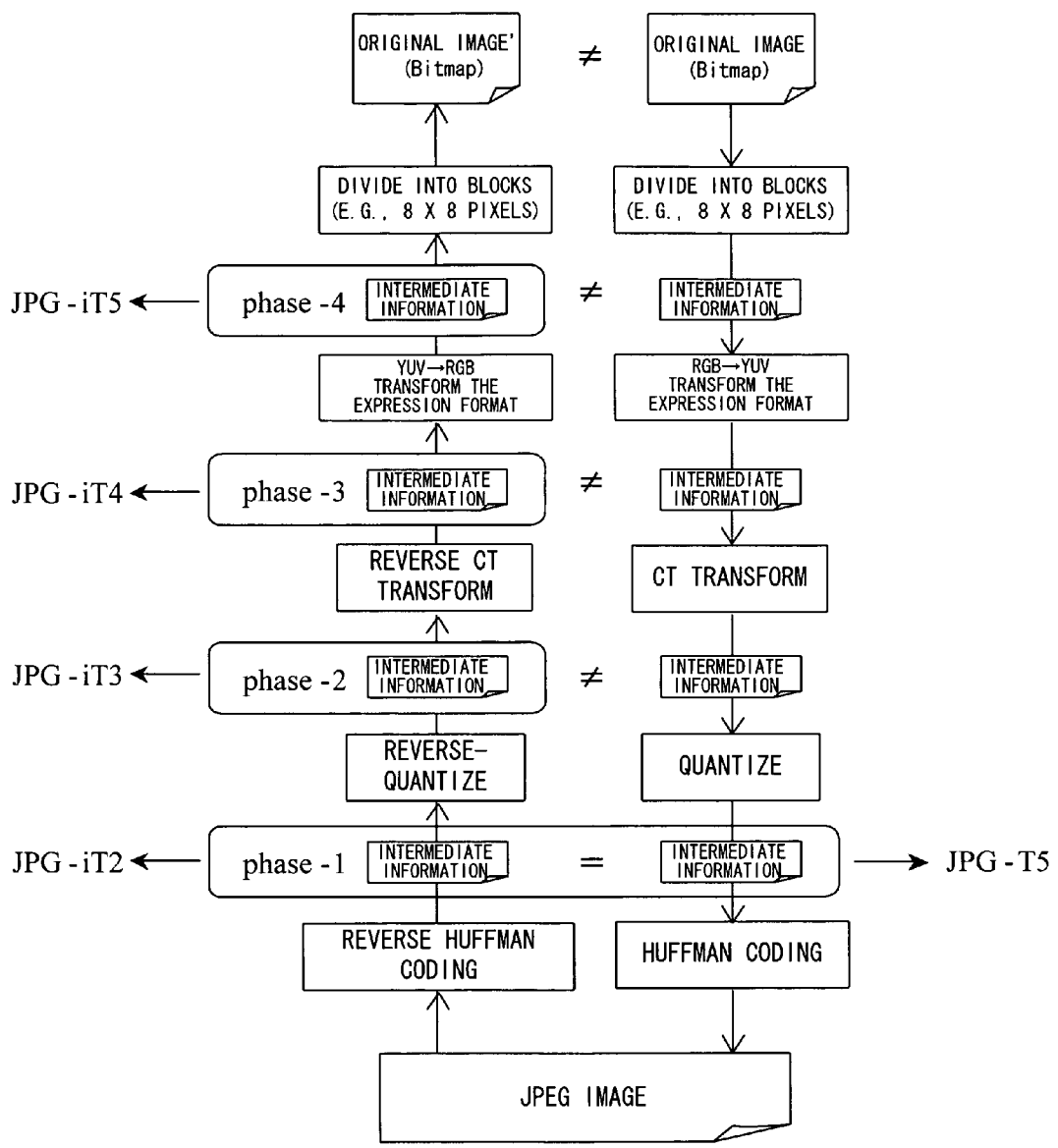
FIG. 21 shows generation points of partial signature information at the time of JPEG coding processing and JPEG decoding processing.

FIG. 21 shows time points when partial signature information can be generated in coding and decoding processing. The generation time points when partial signature information is generated in the coding and decoding processing are total four stages of phase-1 to phase-4. Partial signature information may be generated at any of the time points. However, which time point partial signature information has been generated at is managed by the generation time information as described previously. In the next and subsequent sessions, partial signature information should desirably be generated with use of this generation time information.

Phase-1 is a common stage in which partial signature information can be generated in both the coding and decoding processing. In this case, control needs to be carried out as follows. If partial signature information is generated in JPG-T5 during JPEG coding, partial signature information should be generated in the next or subsequent sessions. If coding is performed from an original image (Bitmap), or if decoding processing is performed with use of a JPEG image, partial signature information should be generated at the phase-1 (or in JPG-T5 during coding or in JPG-iT2 during decoding).

The above description has been made of generation of partial signature information in the JPEG coding processing and decoding processing. The same description applies also to image formats other than JPEG. For example, partial signature information can be generated with respect to a GIF image. Changed portions can be specified, and no alteration having been made to other portions than the changed portions can be confirmed.

Unlike a JPEG image, a GIF image is generated though reversible compression, and causes no problem of selection as to which process in the coding processing or decoding processing partial signature information should be generated. Therefore, the description described previously can be relatively easily applied to GIF images than to JPEG images. In case of JPEG images, compression is achieved by reducing the information quantity. In contrast, in case of GIF images, compression is achieved mainly by putting information in order.

For example, if there is information of "101010" or "111000", both character strings have six characters. The former information can be substituted with data expressing that "10 appears three times". The latter information can be replaced with data expressing that "1 appears 3 times and 0 appears 3 times". This is a method called Run-Length. In case of GIF images, compression is carried out by an information arrangement technique based on this Run-Length method.

Figure 22:
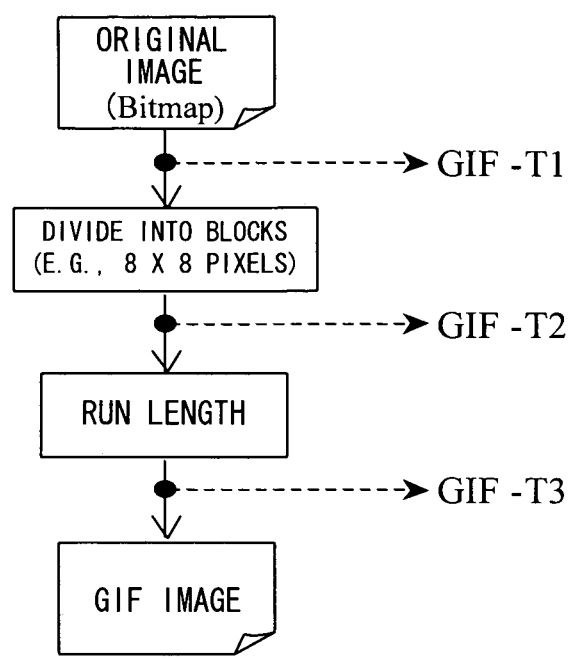
FIG. 22 shows a flow of a GIF coding program.

FIG. 22 shows the flow of a GIF coding program. In this case, one identical original image can be obtained by decoding a coded GIF image in the reverse order. Therefore, if partial signature information is generated at any of time points GIF-T1 to GIF-T3, the identical result is obtained each time. Therefore, partial signature information can be generated at any time point in the entire process from GIF-T1 to GIF-T3.

The same method as applied to GIF images can be also applied to the original image (Bitmap) as a data format according to a non-compression scheme. In case of the original image (Bitmap), the Run-Length method is not carried out since the original image is not compressed. However, partial signature information is generated directly for information which has been divided into blocks (for example, each consisting of 8×8 pixels). This processing is carried out by the original image processing section 33 in the electronic image data verification system 10.

The electronic image data verification program, as described above, to make a computer execute a flowchart indicative of each operation in the embodiment of the present invention may be stored in a recording medium readable from a computer. In this way, a computer can be let execute electronic image data verification based on the electronic image data verification system. In the present invention, the recording medium readable from a computer may be a portable recording medium such as a CD-ROM, flexible disc, DVD disc, magneto-optical disc, or IC card, a database which maintains computer programs, another computer and a database thereof.

According to the embodiment of the present invention, the following requirements which cannot be satisfied by conventional techniques or simple combinations thereof can be satisfied. Further, completeness and originality of a black-overpainted (changed) image can be realized with more ease, even compared with the most similar conventional techniques.

(1) Capability to specify changed portions of electronic image information and confirm non alteration to the other portions than the changed portions (2) Capability to specify persons who have made changes (who have added black-overpaintings and/or who have made corrections)

(3) Capability to confirm that other parts than hidden parts have not been altered even after some parts are hidden (4) Capability to specify the creator of unhidden parts even after some parts are hidden (5) Capability to confirm history process (e.g., when, who, which portions, and how) from the original (first edition) to the latest edition (6) Capability to achieve proof to third parties and distribution using a partially black-overpainted state or using only some edition, without extracting electronic images of all the edition numbers that are stored/managed in the present system

What is claimed is:

1. A non-transitory computer-readable medium having recorded thereon an electronic image data verification program that causes a computer to execute a process comprising:

dividing electronic image information into a plurality of blocks;

transforming the electronic image information into another electronic image format for lossy compression so as to generate transformed electronic image information;

generating partial signature information indicating signature information for each of the plurality of blocks of the electronic image information by applying a hash function to first intermediate information of the plurality of blocks where image information of each of the plurality of blocks is not influenced by image information of other blocks, the first intermediate information being obtained in an intermediate process of format transformation by the transforming and not being influenced by lossy compression;

registering the transformed electronic image information and the partial signature information;

decoding the transformed electronic image information which is registered by the registering;

generating partial signature information for each of the plurality of blocks of the transformed electronic image information which is registered by the registering, by applying the hash function to second intermediate information, the second intermediate information being obtained in an intermediate process of the decoding, a phase when the second intermediate information is obtained in the decoding corresponding to a phase when the first intermediate information is obtained in the format transformation; and verifying, by utilizing the partial signature information for each of the plurality of blocks of the transformed electronic image information and the partial signature information registered by the registering, presence or absence of a change to the electronic image information, or a changed portion when the change has been made to the electronic image information, wherein the registering includes:

providing an electronic signature of a person who has made the change to the electronic image, to transformed electronic image information generated by transforming the changed electronic image and the partial signature information corresponding to the changed electronic image so as to register them, and the verifying includes:

verifying that the change has been made by the person, based on partial signature information corresponding to electronic image information prior to the change, partial signature information corresponding to electronic image information after the change, and the electronic signature of the person.

2. The non-transitory computer-readable medium according to claim 1, wherein the recorded program causes the computer to execute, when the change has been made to the electronic image information, the process including the transforming the electronic image information, the generating partial signature information indicating signature information, the registering, the decoding, the generating partial signature information for each of the plurality of blocks of the transformed electronic image information and the verifying, the registering includes:

providing an electronic signature of a creator of the electronic image to transformed electronic image information generated by transforming the electronic image, and the partial signature information corresponding to the electronic image so as to register them.

3. The non-transitory computer-readable medium according to claim 2, wherein the generating partial signature information indicating the signature information includes:

adding arbitrary information to the first intermediate information of the plurality of blocks;

adding, as the added arbitrary information, first arbitrary information to a block which has not been changed; and adding, as the added arbitrary information, second arbitrary information to a block which has been changed, and the verifying includes:

verifying that the change has been made by the person, based on partial signature information added with the arbitrary information.

4. An electronic image data verification method comprising:

dividing electronic image information into a plurality of blocks;

transforming the electronic image information into another electronic image format for lossy compression so as to generate transformed electronic image information;

generating partial signature information indicating signature information for each of the plurality of blocks of the electronic image information by applying a hash function to first intermediate information of the plurality of blocks where image information of each of the plurality of blocks is not influenced by image information of other blocks, the first intermediate information being obtained in an intermediate process of format transformation by the transforming and not being influenced by lossy compression;

registering the transformed electronic image information and the partial signature information;

decoding the transformed electronic image information which is registered by the registering;

generating partial signature information for each of the plurality of blocks of the transformed electronic image information which is registered by the registering, by applying the hash function to second intermediate information, the second intermediate information being obtained in an intermediate process of the decoding, a phase when the second intermediate information is obtained in the decoding corresponding to a phase when the first intermediate information is obtained in the format transformation; and verifying, by utilizing the partial signature information for each of the plurality of blocks of the transformed electronic image information and the partial signature information registered by the registering, presence or absence of a change to the electronic image information, or a changed portion when the change has been made to the electronic image information, wherein the registering includes:

providing an electronic signature of a person who has made the change to the electronic image, to transformed electronic image information generated by transforming the changed electronic image and the partial signature information corresponding to the changed electronic image so as to register them, and the verifying includes:

verifying that the change has been made by the person, based on partial signature information corresponding to electronic image information prior to the change, partial signature information corresponding to electronic image information after the change, and the electronic signature of the person.

5. The method according to claim 4, further comprising:

executing, when the change has been made to the electronic image information, the process including the transforming the electronic image information, the generating partial signature information indicating signature information, the registering, the decoding, the generating partial signature information for each of the plurality of blocks of the transformed electronic image information and the verifying, wherein the registering includes:

providing an electronic signature of a creator of the electronic image to transformed electronic image information generated by transforming the electronic image, and the partial signature information corresponding to the electronic image so as to register them.

6. The method according to claim 5, wherein the generating partial signature information indicating the signature information includes:

adding arbitrary information to the first intermediate information of the plurality of blocks;

adding, as the added arbitrary information, first arbitrary information to a block which has not been changed; and adding, as the added arbitrary information, second arbitrary information to a block which has been changed, and the verifying includes:

verifying that the change has been made by the person, based on partial signature information added with the arbitrary information.

7. An electronic image data verification apparatus comprising:

a hardware processor configured to:

divide electronic image information into a plurality of blocks;

transform the electronic image information into another electronic image format for lossy compression so as to generate transformed electronic image information;

generate partial signature information indicating signature information for each of the plurality of blocks of the electronic image information by applying a hash function to first intermediate information of the plurality of blocks where image information of each of the plurality of blocks is not influenced by image information of other blocks, the first intermediate information being obtained in an intermediate process of format transformation and not being influenced by lossy compression;

register the transformed electronic image information and the partial signature information; and decode the transformed electronic image information which is registered;

generate partial signature information for each of the plurality of blocks of the transformed electronic image information which is registered by the registering, by applying the hash function to second intermediate information, the second intermediate information being obtained in an intermediate process of the decoding, a phase when the second intermediate information is obtained in the decoding corresponding to a phase when the first intermediate information is obtained in the format transformation, and verify, by utilizing the partial signature information for each of the plurality of blocks of the transformed electronic image information and the partial signature information, presence or absence of a change to the electronic image information, or a changed portion when the change has been made to the electronic image information, wherein when the change has been made to the electronic image information, the hardware processor provides an electronic signature of a person who has made the change to the electronic image, to transformed electronic image information generated by transforming the changed electronic image and the partial signature information corresponding to the changed electronic image so as to register them, and the hardware processor verifies that the change has been made by the person, based on partial signature information corresponding to electronic image information prior to the change, partial signature information corresponding to electronic image information after the change, and the electronic signature of the person.

8. The apparatus according to claim 7, wherein when the change has been made to the electronic image information, the transforming section, the generating section, the registering section, the decoding section and the verifying section are activated, the hardware processor provides an electronic signature of a creator of the electronic image to transformed electronic image information generated by transforming the electronic image and the partial signature information corresponding to the electronic image so as to register them.

9. The apparatus according to claim 8, wherein the hardware processor adds arbitrary information to the first intermediate information of the plurality of blocks, adds, as the added arbitrary information, first arbitrary information to a block which has not been changed, and adds, as the added arbitrary information, second arbitrary information to a block which has been changed, and the hardware processor verifies that the change has been made by the person, based on partial signature information added with the arbitrary information.

* * * * *